United States Patent
Iwasaki et al.

(10) Patent No.: US 8,320,079 B2
(45) Date of Patent: Nov. 27, 2012

(54) MAGNETIC HEAD ASSEMBLY AND MAGNETIC RECORDING/REPRODUCING APPARATUS

(75) Inventors: Hitoshi Iwasaki, Yokosuka (JP); Kenichiro Yamada, Tokyo (JP); Masayuki Takagishi, Tokyo (JP); Tomomi Funayama, Tokyo (JP); Masahiro Takashita, Yokohama (JP); Mariko Shimizu, Yokohama (JP); Soichi Oikawa, Tokyo (JP); Katsuhiko Koui, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 604 days.

(21) Appl. No.: 12/457,657

(22) Filed: Jun. 17, 2009

(65) Prior Publication Data
US 2010/0007996 A1    Jan. 14, 2010

(30) Foreign Application Priority Data

Jun. 19, 2008   (JP) .................................. 2008-160856

(51) Int. Cl.
G11B 5/127   (2006.01)
G11B 5/187   (2006.01)
(52) U.S. Cl. .................. 360/128; 360/125.3; 360/125.71
(58) Field of Classification Search .................. 360/324, 360/125.3, 125.71, 128
See application file for complete search history.

(56) References Cited

U.S. PATENT DOCUMENTS

| | | |
|---|---|---|
| 4,103,315 A | 7/1978 | Hempstead et al. |
| 4,945,528 A | 7/1990 | Crasemann |
| 5,695,864 A | 12/1997 | Slonczewski |
| 5,748,399 A | 5/1998 | Gill |
| 5,768,066 A | 6/1998 | Akiyama et al. |
| 5,898,546 A | 4/1999 | Kanai et al. |
| 5,920,447 A | 7/1999 | Sakata et al. |
| 6,011,664 A | 1/2000 | Kryder et al. |
| 6,094,328 A | 7/2000 | Saito |
| 6,153,062 A | 11/2000 | Saito |
| 6,278,576 B1 | 8/2001 | Ogata et al. |
| 6,282,069 B1 | 8/2001 | Nakazawa et al. |
| 6,519,119 B1 | 2/2003 | van der Heijden et al. |
| 6,580,589 B1 | 6/2003 | Gill |
| 6,583,969 B1 | 6/2003 | Pinarbasi |
| 6,591,479 B2 | 7/2003 | Nakazawa et al. |

(Continued)

FOREIGN PATENT DOCUMENTS
JP    64-070947    3/1989
(Continued)

OTHER PUBLICATIONS

X. Zhu and J.-G. Zhu, "Bias-Field-Free Microwave Oscillator Driven by Perpendicularly Polarized Spin Current," IEEE Trans. Magn. vol. 42, p. 2670 (2006).

(Continued)

Primary Examiner — Brian Miller
(74) Attorney, Agent, or Firm — Nixon & Vanderhye, P.C.

(57) ABSTRACT

It is made possible to reduce the write magnetic field generated from the main magnetic pole toward the spin torque oscillator, so as to reduce the variation in the oscillation characteristics of the spin torque oscillator, and reduce the current required for oscillation. The magnetic head assembly includes: a recording magnetic pole; a spin torque oscillator that has first and second magnetic layers, and an intermediate layer interposed between the first and second magnetic layers, the spin torque oscillator generating a high-frequency magnetic field by applying a current between the first and second magnetic layers; and a third magnetic layer that is placed adjacent to at least part of a side face of the second magnetic layer.

7 Claims, 16 Drawing Sheets

U.S. PATENT DOCUMENTS

| | | |
|---|---|---|
| 6,608,739 B1 | 8/2003 | Tanaka et al. |
| 6,621,664 B1 | 9/2003 | Trindade et al. |
| 6,697,231 B1 | 2/2004 | Kikuiri |
| 6,785,092 B2 | 8/2004 | Covington et al. |
| 6,809,900 B2 | 10/2004 | Covington |
| 6,927,952 B2 | 8/2005 | Shimizu et al. |
| 6,937,446 B2 | 8/2005 | Kamiguchi et al. |
| 6,977,108 B2 | 12/2005 | Hieda et al. |
| 6,982,845 B2 | 1/2006 | Kai et al. |
| 7,106,555 B2 | 9/2006 | Kikuiri et al. |
| 7,119,990 B2 | 10/2006 | Bajorek et al. |
| 7,120,988 B2 | 10/2006 | Le et al. |
| 7,145,752 B2 | 12/2006 | Ueda et al. |
| 7,154,707 B2 | 12/2006 | Watabe et al. |
| 7,256,955 B2 | 8/2007 | Pokhil et al. |
| 7,397,633 B2 | 7/2008 | Xue et al. |
| 7,461,933 B2 | 12/2008 | Deily et al. |
| 7,466,525 B2 | 12/2008 | Hasegawa et al. |
| 7,471,491 B2 | 12/2008 | Sato et al. |
| 7,473,478 B2 | 1/2009 | Sbiaa et al. |
| 7,486,475 B2 | 2/2009 | Biskeborn |
| 7,504,898 B2 | 3/2009 | Fukuzawa et al. |
| 7,532,433 B2 | 5/2009 | Kawato et al. |
| 7,532,434 B1 | 5/2009 | Schrek et al. |
| 7,593,185 B2 | 9/2009 | Yazawa |
| 7,616,412 B2* | 11/2009 | Zhu et al. ............ 360/324.2 |
| 7,675,129 B2 | 3/2010 | Inomata et al. |
| 7,724,469 B2* | 5/2010 | Gao et al. ............ 360/125.3 |
| 7,732,881 B2 | 6/2010 | Wang |
| 7,764,136 B2 | 7/2010 | Suzuki |
| 7,791,829 B2 | 9/2010 | Takeo et al. |
| 7,808,330 B2 | 10/2010 | Fukuzawa et al. |
| 7,911,882 B2 | 3/2011 | Shimazawa et al. |
| 7,957,098 B2 | 6/2011 | Yamada et al. |
| 8,139,322 B2 | 3/2012 | Yamada et al. |
| 8,154,825 B2 | 4/2012 | Takashita et al. |
| 8,164,854 B2 | 4/2012 | Takagishi et al. |
| 2001/0017746 A1 | 8/2001 | Nishida et al. |
| 2001/0017752 A1 | 8/2001 | Hoshiya et al. |
| 2002/0006013 A1 | 1/2002 | Sato et al. |
| 2002/0051330 A1 | 5/2002 | Heijden et al. |
| 2002/0075595 A1 | 6/2002 | Sato et al. |
| 2002/0097536 A1 | 7/2002 | Komuro et al. |
| 2002/0136927 A1 | 9/2002 | Hieda et al. |
| 2003/0026040 A1 | 2/2003 | Covington et al. |
| 2003/0090844 A1 | 5/2003 | Shimizu et al. |
| 2004/0070869 A1 | 4/2004 | Nishida et al. |
| 2004/0145828 A1 | 7/2004 | Im |
| 2004/0150912 A1 | 8/2004 | Kawato et al. |
| 2004/0190197 A1 | 9/2004 | Watabe et al. |
| 2004/0228045 A1 | 11/2004 | Hasegawa et al. |
| 2005/0023938 A1 | 2/2005 | Sato et al. |
| 2005/0105213 A1 | 5/2005 | Takeo et al. |
| 2005/0110004 A1 | 5/2005 | Parkin et al. |
| 2005/0207050 A1 | 9/2005 | Pokhil |
| 2005/0219771 A1 | 10/2005 | Sato et al. |
| 2006/0171051 A1 | 8/2006 | Wachenschwanz et al. |
| 2006/0198047 A1 | 9/2006 | Xue et al. |
| 2006/0221507 A1 | 10/2006 | Sato et al. |
| 2007/0063237 A1 | 3/2007 | Huai et al. |
| 2007/0109147 A1 | 5/2007 | Fukuzawa et al. |
| 2008/0019040 A1 | 1/2008 | Zhu et al. |
| 2008/0112087 A1 | 5/2008 | Clinton et al. |
| 2008/0112095 A1* | 5/2008 | Carey et al. ............ 360/324.12 |
| 2008/0117545 A1 | 5/2008 | Batra et al. |
| 2008/0129401 A1 | 6/2008 | Fukuzawa et al. |
| 2008/0137224 A1 | 6/2008 | Gao et al. |
| 2008/0150643 A1 | 6/2008 | Suzuki et al. |
| 2008/0208733 A1 | 8/2008 | Robb et al. |
| 2008/0218891 A1 | 9/2008 | Gubbins et al. |
| 2008/0268291 A1 | 10/2008 | Akiyama et al. |
| 2008/0304176 A1 | 12/2008 | Takagishi et al. |
| 2009/0052095 A1 | 2/2009 | Yamada et al. |
| 2009/0059417 A1 | 3/2009 | Takeo et al. |
| 2009/0059418 A1 | 3/2009 | Takeo et al. |
| 2009/0059423 A1* | 3/2009 | Yamada et al. ............ 360/122 |
| 2009/0080105 A1* | 3/2009 | Takashita et al. ............ 360/75 |
| 2009/0080106 A1* | 3/2009 | Shimizu et al. ............ 360/75 |
| 2009/0080120 A1 | 3/2009 | Funayama et al. |
| 2009/0088095 A1 | 4/2009 | Kayano et al. |
| 2009/0097167 A1 | 4/2009 | Sato et al. |
| 2009/0097169 A1 | 4/2009 | Sato et al. |
| 2009/0115541 A1 | 5/2009 | Persson et al. |
| 2009/0168269 A1* | 7/2009 | Carey et al. ............ 360/324.11 |
| 2009/0225465 A1 | 9/2009 | Iwasaki et al. |
| 2009/0257151 A1 | 10/2009 | Zhang et al. |
| 2009/0262457 A1 | 10/2009 | Rivkin et al. |
| 2009/0316303 A1 | 12/2009 | Yamada et al. |
| 2009/0316304 A1 | 12/2009 | Funayama et al. |
| 2010/0007992 A1 | 1/2010 | Yamada et al. |
| 2010/0007996 A1* | 1/2010 | Iwasaki et al. ............ 360/324 |
| 2010/0033881 A1* | 2/2010 | Carey et al. ............ 360/324.11 |
| 2010/0110592 A1 | 5/2010 | Koui et al. |
| 2010/0134922 A1 | 6/2010 | Yamada et al. |
| 2010/0220415 A1 | 9/2010 | Yamada et al. |
| 2011/0038080 A1 | 2/2011 | Alex et al. |
| 2011/0038081 A1* | 2/2011 | Contreras et al. ............ 360/125.03 |
| 2011/0128652 A1* | 6/2011 | Taguchi et al. ............ 360/123.12 |
| 2011/0134561 A1* | 6/2011 | Smith et al. ............ 360/59 |
| 2011/0141629 A1* | 6/2011 | Braganca et al. ............ 360/313 |
| 2011/0205655 A1 | 8/2011 | Shimizu et al. |
| 2011/0299192 A1 | 12/2011 | Yamada et al. |
| 2011/0300409 A1 | 12/2011 | Yamada et al. |

FOREIGN PATENT DOCUMENTS

| | | |
|---|---|---|
| JP | 05-20635 | 1/1993 |
| JP | 07-244801 | 9/1995 |
| JP | 2001-243602 | 9/2001 |
| JP | 2002-100005 | 4/2002 |
| JP | 2002-109712 | 4/2002 |
| JP | 2002-208744 | 7/2002 |
| JP | 2002-279616 | 9/2002 |
| JP | 2003-317220 | 11/2003 |
| JP | 2004-192744 | 7/2004 |
| JP | 2004-207707 | 7/2004 |
| JP | 2004-234830 | 8/2004 |
| JP | 2004-295987 | 10/2004 |
| JP | 2005-108315 | 4/2005 |
| JP | 2005-525663 | 8/2005 |
| JP | 2005-285242 | 10/2005 |
| JP | 2005-310363 | 11/2005 |
| JP | 2006-134540 | 5/2006 |
| JP | 2006-147023 | 6/2006 |
| JP | 2006-209960 | 8/2006 |
| JP | 2006-209964 | 8/2006 |
| JP | 2006-244693 | 9/2006 |
| JP | 2006-286855 | 10/2006 |
| JP | 3833512 | 10/2006 |
| JP | 2007-012264 | 1/2007 |
| JP | 2007-035251 | 2/2007 |
| JP | 2007-124340 | 5/2007 |
| JP | 2007-184923 | 7/2007 |
| JP | 2007-193906 | 8/2007 |
| JP | 2008-123669 | 5/2008 |
| JP | 2008-176908 | 7/2008 |
| JP | 2009-070439 | 4/2009 |
| KR | 1020030039289 | 5/2003 |
| WO | 2006-101040 | 9/2006 |

OTHER PUBLICATIONS

Zhu et al., "Microwave Assisted Magnetic Recording (MAMR)," Digest of the 18$^{th}$ Magnetic Recording conference, pp. 34-35, 2007.

Maat et al., "Magnetotransport properties and spin-torque effects in current perpendicular to the plane spin valves with Co-Fe-Al magnetic layers", Journal of Applied Physics 101, 093905 (2007); May 9, 2007.

Akiyama et al., U.S. Appl. No. 12/109,760, filed Apr. 25, 2008.
Yamada et al., U.S. Appl. No. 12/153,490, filed May 20, 2008.
Yamada et al., U.S. Appl. No. 12/155,329, filed Jun. 2, 2008.
Takagishi et al., U.S. Appl. No. 12/155,473, filed Jun. 4, 2008.
Takeo et al., U.S. Appl. No. 12/196,628, filed Aug. 22, 2008.
Takeo et al., U.S. Appl. No. 12/196,841, filed Aug. 22, 2008.
Iwasaki et al., U.S. Appl. No. 12/232,014, filed Sep. 9, 2008.
Takashita et al., U.S. Appl. No. 12/232,391, filed Sep. 16, 2008.
Funayama et al., U.S. Appl. No. 12/232,392, filed Sep. 16, 2008.

Shimizu et al., U.S. Appl. No. 12/232,469, filed Sep. 17, 2008.
Yamada et al., U.S. Appl. No. 12/382,940, filed Mar. 26, 2009.
Takagishi et al., U.S. Appl. No. 12/461,027, filed Jul. 29, 2009.
Yamada et al., U.S. Appl. No. 12/780,269, filed May 13, 2010.
Yamada et al., U.S. Appl. No. 13/214,012, filed Aug. 19, 2011.
Yamada et al., U.S. Appl. No. 13/214,033, filed Aug. 19, 2011.
Park et al., "Effect of Adjacent Layers on Crystallization and Magnetoresistance in CoFeB/MgO/CoFeB Magnetic Tunnel Junction", IEEE Transactions of Magnetics, vol. 42, No. 10, Oct. 2006.

Shen et al., "Effect of Film Roughness in MgO-based Magnetic Tunnel Junctions", Applied Physics Letters 88, 182508 (2006).
Tang et al., "Narrow Track Confinement by AC Field Generation Layer in Microwave Assisted Magnetic Recording", IEEE Transactions of Magnetics, vol. 44, Issue 11, pp. 3376-3379 (Nov. 2008).
Koui et al., U.S. Appl. No. 12/591,055, filed Nov. 5, 2009.
Shimizu et al., U.S. Appl. No. 12/737,691, filed Feb. 7, 2011.
Office Action dated Sep. 28, 2012 in Japanese Application No. 2008-160856 with English-language translation thereof.

* cited by examiner

MAGNETIC HEAD ASSEMBLY AND MAGNETIC RECORDING/REPRODUCING APPARATUS

CROSS-REFERENCE TO RELATED APPLICATION

This application is based upon and claims the benefit of priority from prior Japanese Patent Application No. 2008-160856 filed on Jun. 19, 2008 in Japan, the entire contents of which are incorporated herein by reference.

BACKGROUND OF THE INVENTION

1. Field of the Invention

The present invention relates to a magnetic recording head that has a spin torque oscillator suitable for data storage of high recording density, high recording capacity, and a high data transfer rate. The present invention also relates to a magnetic head assembly and a magnetic recording/reproducing apparatus.

2. Related Art

In 1990's, there were dramatic increases in recording density and recording capacity of an HDD (hard disk drive), as MR (Magneto-Resistive effect) heads and GMR (Giant Magneto-Resistive effect) heads were put into practical use. However, the recording density increase rate temporarily became lower in the beginning of the 2000's, since the problem of heat fluctuations of magnetic recording media rose up to the surface. Recently, the HDD recording density has been increasing about 40% per annum, as the vertical magnetic recording that was more suitable for high-density recording in principle than in-plane magnetic recording were put into practical use in 2005.

In the latest recording density demonstration experiment, the 250 Gbits/inch$^2$ level has been reached. If the progress continues at this rate, recording density of 1 Tbits/inch$^2$ is expected to be reached around the year 2012. However, achieving such high recording density is considered not easy even by a vertical magnetic recording method, as the problem of heat fluctuations will surface again.

As a recording method to solve the above problem, a "high-frequency field assist recording method" has been suggested. By the high-frequency field assist recording method, a high-frequency magnetic field that is much higher than a recording signal frequency and is close to the resonance frequency of the magnetic recording medium is locally induced. As a result, the magnetic recording medium resonates, and the coercive force Hc of the magnetic recording medium having the high-frequency magnetic field induced therein can be greatly reduced. Therefore, by overlapping the recording magnetic field with the high-frequency magnetic field, magnetic recording can be performed on a magnetic recording medium that has much higher coercive force Hc and much greater magnetic anisotropic energy Ku.

As a technique for generating a high-frequency magnetic field, a technique that involves a spin torque oscillator has been suggested (see U.S. Patent Application Publication Nos. 2005/0023938 and 2008/0019040, for example). According to the techniques disclosed in U.S. Patent Application Publication Nos. 2005/0023938 and 2008/0019040, the spin torque oscillator includes a spin injection layer, a nonmagnetic layer, a magnetic layer, and a pair of electrode layers that sandwich those layers. When a direct current flows into the spin torque oscillator through the pair of electrode layers, the magnetization of the magnetic layer ferromagnetically resonates by virtue of the spin torque generated from the spin injection layer. As a result, a high-frequency magnetic field is generated from the spin torque oscillator.

Since the size of the spin torque oscillator is several tens of nanometers, the generated high-frequency magnetic field locally exists at a distance of several tens of nanometers from the spin torque oscillator. Further, the in-plane components of the high-frequency magnetic field can efficiently cause a vertically-magnetized magnetic recording medium to resonate, and the coercive force of the magnetic recording medium can be greatly reduced. As a result, high-density magnetic recording is performed only on the region where the recording magnetic field generated from the main magnetic pole is overlapped with the high-frequency magnetic field generated from the spin torque oscillator. Accordingly, it becomes possible to use a magnetic recording medium having high coercive force Hc and large magnetic anisotropic energy Ku. Thus, the problem of heat fluctuations to be caused at the time of high-density recording can be avoided.

In a case where the spin torque oscillator is located close to the main magnetic pole in the above structure, however, a large magnetic field is generated from the main magnetic pole toward the spin torque oscillator when writing is performed. The write magnetic field generated from the main magnetic pole has its direction reversed between positive and negative directions, depending on the writing direction. As a result, the oscillation characteristics of the spin torque oscillator are greatly changed with the change in the write magnetic field generated from the main magnetic field, and it becomes difficult to generate a stable high-frequency magnetic field.

As will be described later, due to the magnetic field generated from the main magnetic pole, the oscillation frequency of the spin torque oscillator and the current density required for oscillation are increased, and it becomes difficult to maintain the reliability of the spin torque oscillator.

SUMMARY OF THE INVENTION

The present invention has been made in view of these circumstances, and an object thereof is to provide a magnetic recording head for high-frequency field assist recording that can reduce the write magnetic field generated from the main magnetic pole toward the spin torque oscillator, and a magnetic recording apparatus that uses the magnetic recording head.

A magnetic head assembly according to a first aspect of the present invention includes: a magnetic recording unit that includes: a recording magnetic pole; a spin torque oscillator that has first and second magnetic layers, and an intermediate layer interposed between the first and second magnetic layers, the spin torque oscillator generating a high-frequency magnetic field by applying a current between the first and second magnetic layers; and a third magnetic layer that is placed adjacent to at least part of a side face of the second magnetic layer.

A magnetic head assembly according to a second aspect of the present invention includes: a recording magnetic pole; a spin torque oscillator that has first and second magnetic layers, and an intermediate layer interposed between the first and second magnetic layers, the spin torque oscillator generating a high-frequency magnetic field by applying a current between the first and second magnetic layers; and a magnetic shield that is provided to face surfaces of the recording magnetic pole and the second magnetic layer, the surfaces existing in a track movement direction, a distance between the magnetic shield and the second magnetic layer being shorter than a distance between the recording magnetic pole and the magnetic shield.

A magnetic recording/reproducing apparatus according to a third aspect of the present invention includes: a magnetic recording medium; the magnetic head assembly according to the first or second aspect; a movement control unit that controls the magnetic recording medium and the magnetic head assembly to have relative movements in a floating or contact state, the magnetic recording medium and the magnetic head assembly facing each other; a position control unit that controls the magnetic head assembly to be located in a predetermined recording position of the magnetic recording medium; and a signal processing means that performs processing on a signal for writing on the magnetic recording medium and a signal for reading from the magnetic recording medium, with the use of the magnetic head assembly.

DETAILED DESCRIPTION OF THE INVENTION

First, the background to the present invention is explained, before embodiments of the present invention are described.

The inventors made intensive studies involving simulations and the likes, so as to find a technique for reducing the variation of the oscillation characteristics of a spin torque oscillator due to a write magnetic field generated from a main magnetic pole. As a result, the inventors discovered that the oscillation frequency of the spin torque oscillator and the current density required for oscillation increased in proportion to the write magnetic field generated from the main magnetic pole. Furthermore, through the simulations, it became apparent that, when a write magnetic field of 10 kOe or greater from the write magnetic field was induced in the spin torque oscillator in the magnetic head structure disclosed in U.S. Patent Application Publication No. 2008/0019040, the oscillation frequency of the spin torque oscillator became 30 GHz or higher, and the current density became 500 MA/cm$^2$. Writing using a high-frequency magnetic field of 30 GHz or higher can be performed only on magnetic recording media having great magnetic anisotropic energy Ku. Also, if the current density in the spin torque oscillator is 500 MA/cm$^2$, it becomes difficult to maintain the reliability of the spin torque oscillator due to heat generation.

To solve above problems, the inventors made further intensive studies. As a result, the inventors discovered that, by providing a magnetic material at a side portion of the spin torque oscillator, the variation of the oscillation characteristics of the spin torque oscillator due to the write magnetic field generated from the main magnetic pole could be reduced, and the write magnetic field generated from the main magnetic pole toward the spin torque oscillator could also be reduced. These findings will be described as embodiments in the following.

(First Embodiment)

Figure 1:
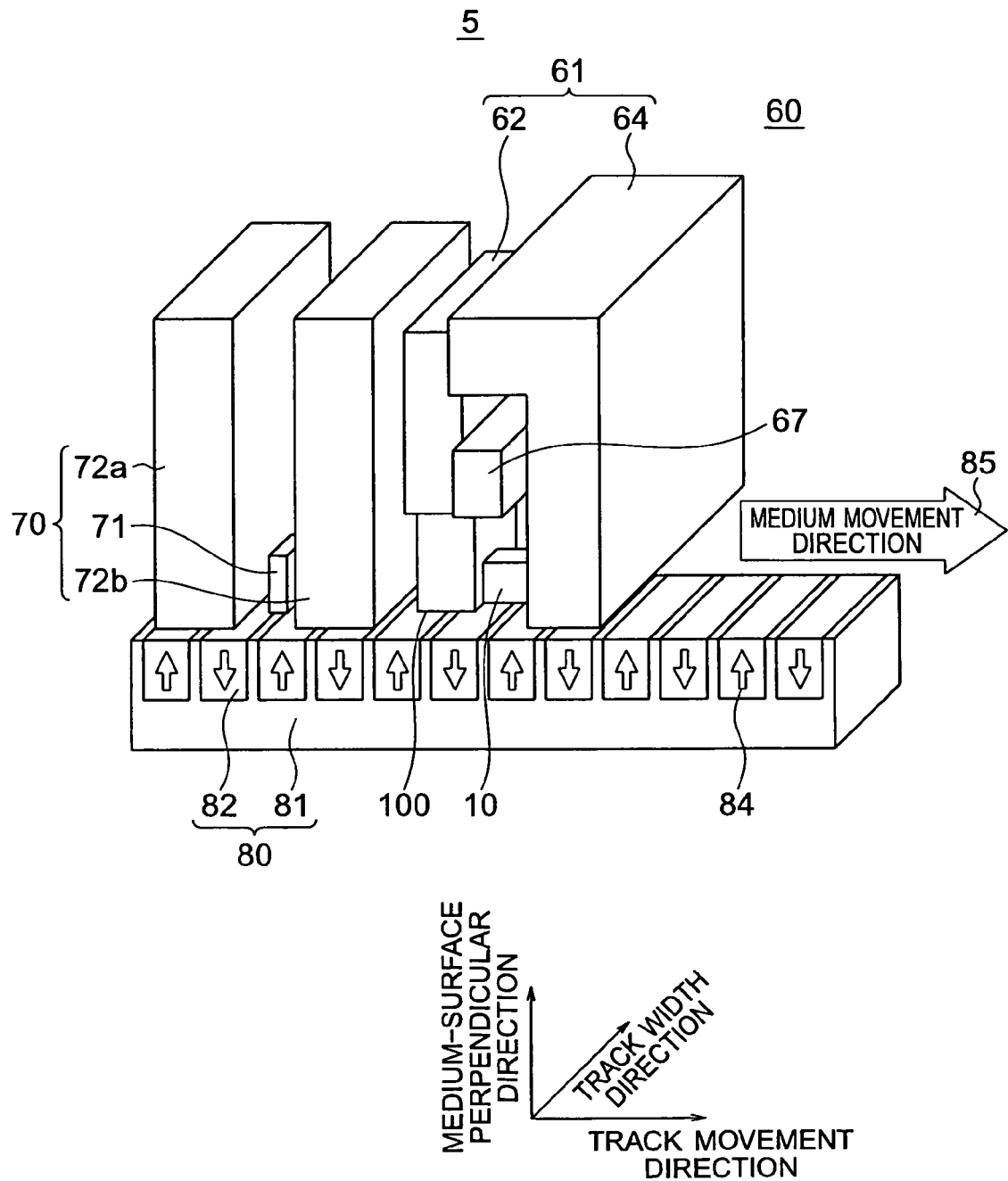
FIG. 1 is a schematic perspective view showing the structure of a magnetic recording head according to a first embodiment.
Figure 2:
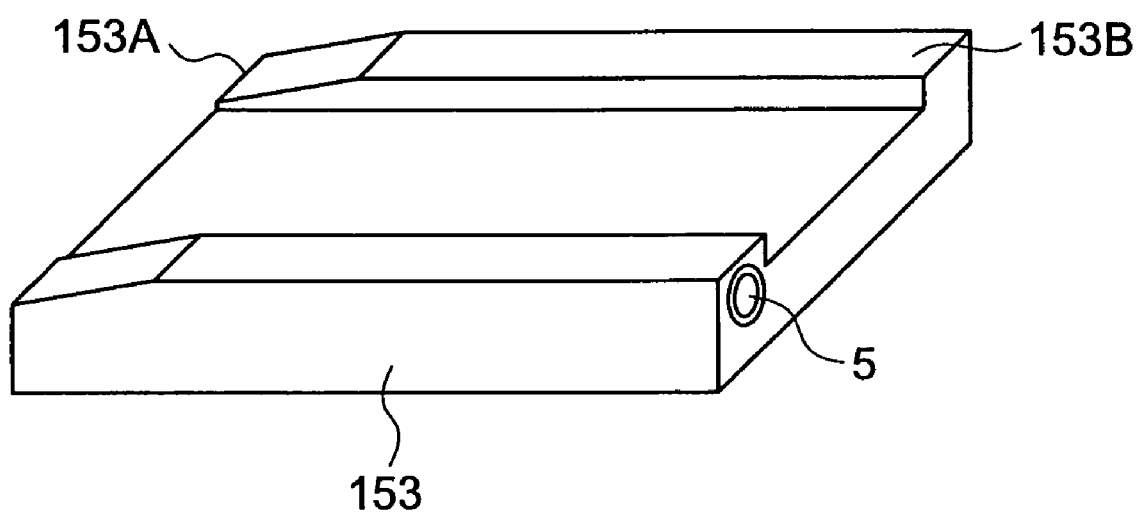
FIG. 2 is a perspective view showing a head slider on which the magnetic recording head is to be mounted.
Figure 3:
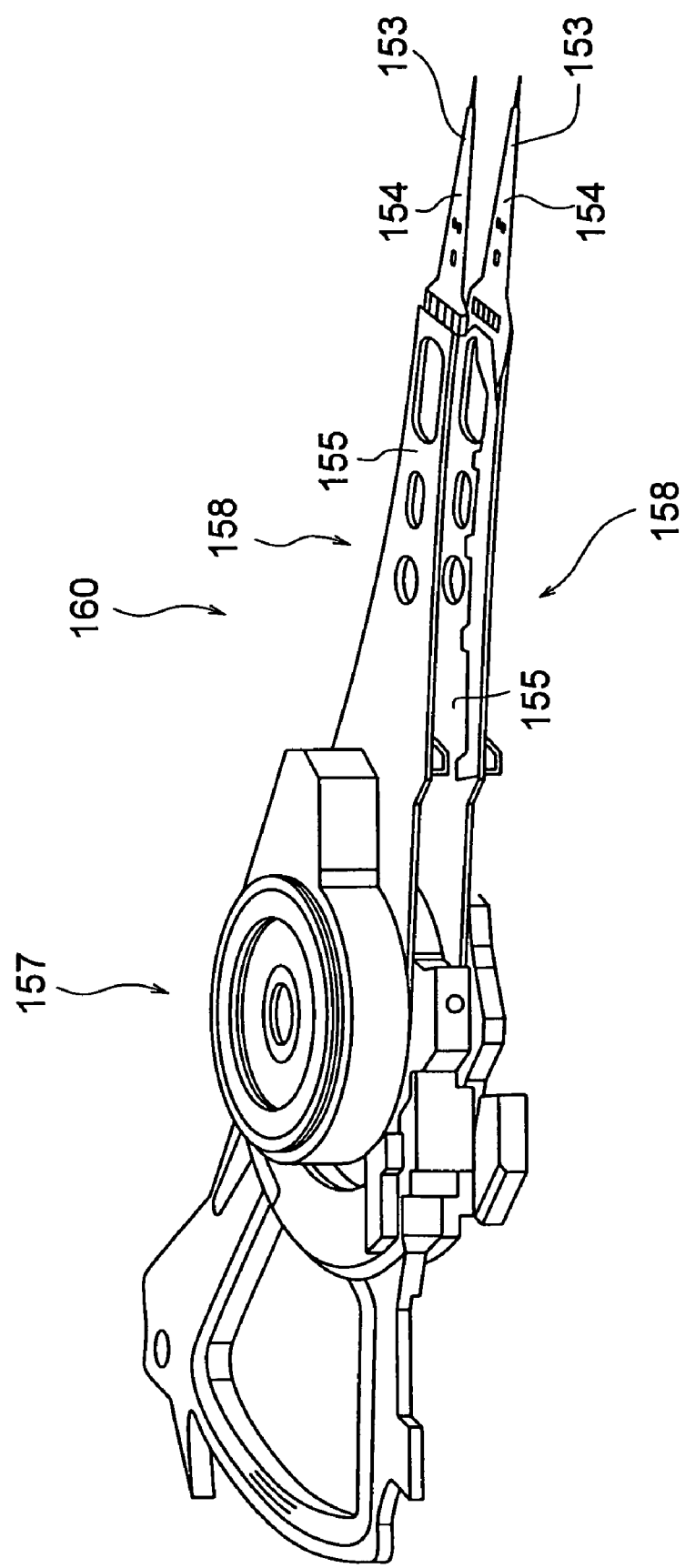
FIG. 3 is a perspective view showing a head stack assembly on which the head slider is to be mounted.
Figure 4:
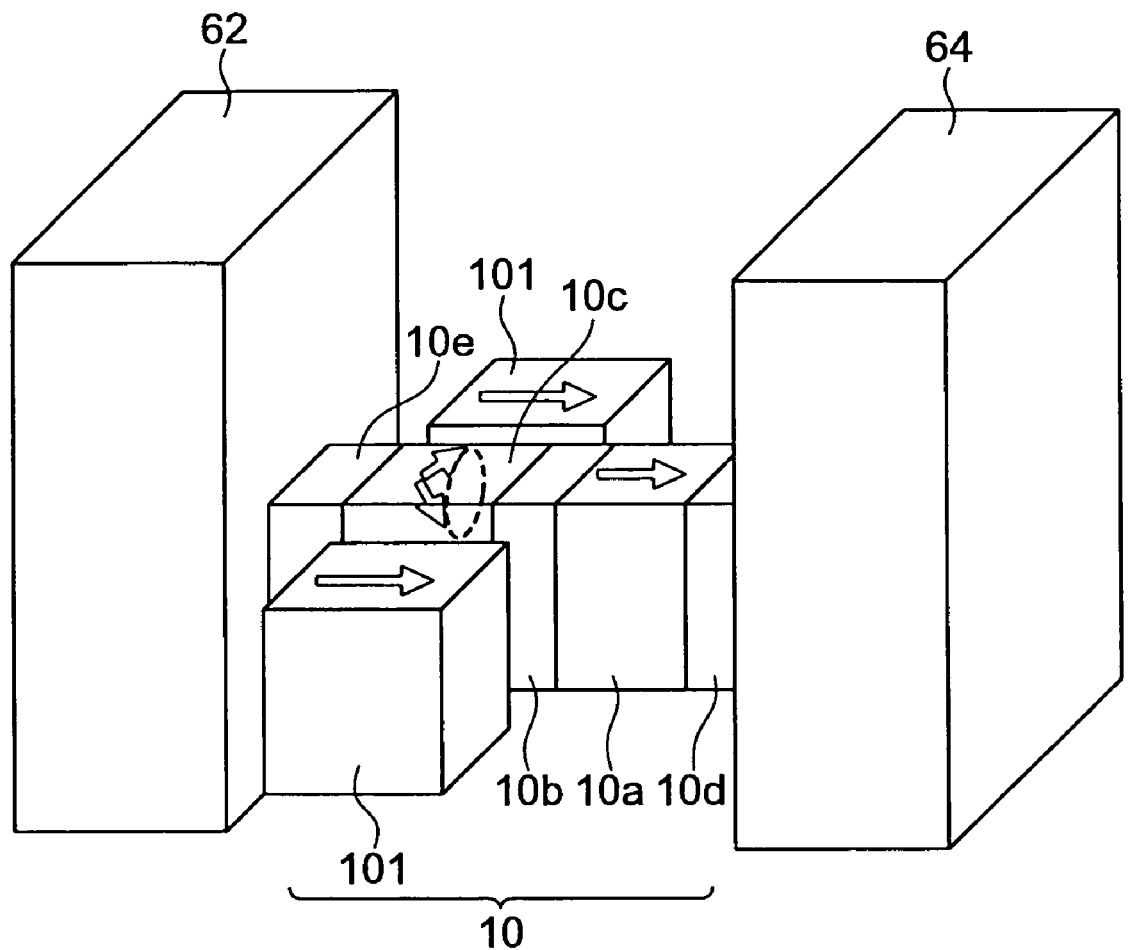
FIG. 4 is a perspective view showing the arrangement of a spin torque oscillator and sidewall magnetic layers provided in the magnetic recording head of the first embodiment.
Figure 5:
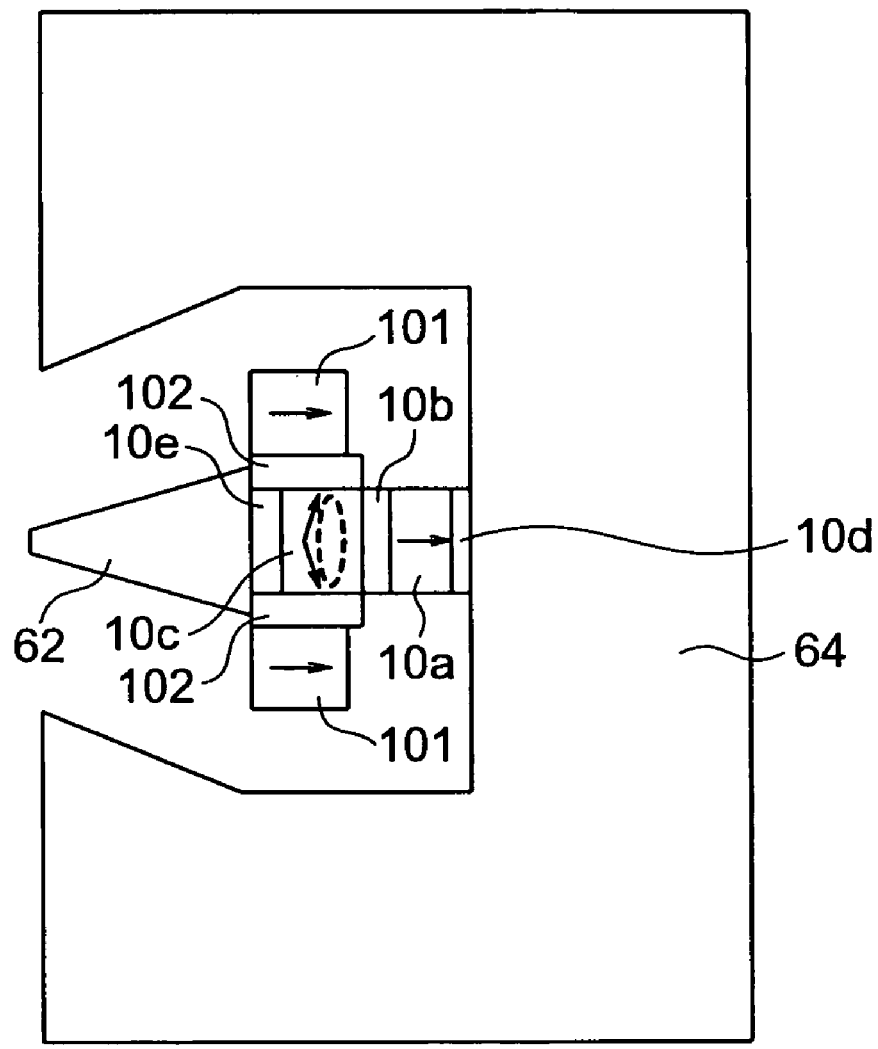
FIG. 5 is a plan view of the magnetic recording head of the first embodiment, seen from the magnetic recording medium side.
Figure 5:
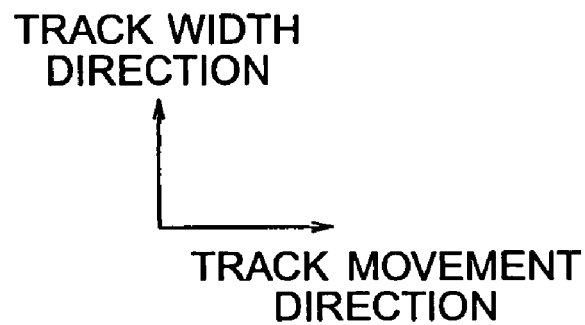

Referring to FIGS. 1 through 5, a magnetic recording head for high-frequency field assist recording in accordance with a first embodiment of the present invention is described. FIG. 1 is a schematic perspective view showing the structure of the magnetic recording head 5 of this embodiment. FIG. 2 is a perspective view of a head slider 153 on which the magnetic recording head 5 is mounted. FIG. 3 is a perspective view of a head stack assembly 160 on which the head slider 153 is mounted, seen from the side of a magnetic recording medium 80. FIG. 4 is a perspective view showing the arrangement of a spin torque oscillator 10 and sidewall magnetic layers 101 that are provided in the magnetic recording head 5 of this embodiment. FIG. 5 is a plan view of the magnetic recording head 5, seen from the side of the magnetic recording medium 80.

The magnetic recording head 5 of this embodiment includes a writing head unit 60 and a reproducing head unit 70. The reproducing head unit 70 includes a magnetic reproducing device 71, and magnetic shield layers 72a and 72b that sandwich the magnetic reproducing device 71. The magnetic reproducing device 71 may be a GMR device, a TMR device, or the like. To increase the reproducing resolution capability, the magnetic reproducing device 71 is interposed between the end portions of the two magnetic shield layers 72a and 72b on the side of the magnetic recording medium 80.

The writing head unit 60 includes a magnetic core 61 formed with a main magnetic pole (a recording magnetic pole) 62 and a magnetic shield (a return yoke) 64, a magnetizing coil 67 for magnetizing the magnetic core 61, the spin torque oscillator 10, and the sidewall magnetic layers 101 provided on the sidewalls of the later described oscillating layer of the spin torque oscillator 10. The spin torque oscillator 10 is interposed between the end portions of the main magnetic pole 62 and the magnetic shield 64 on the side of the magnetic recording medium 80. The components of the writing head unit 60 are isolated from the components of the reproducing head unit 70 by an insulating material (not shown) such as alumina.

This magnetic recording head 5 is mounted on the head slider 153, as shown in FIG. 2. The head slider 153 is a stacked structure of Al$_2$O$_3$ and TiC or the like, and is designed to have relative movements while floating on or being in contact with the magnetic recording medium 80 such as a magnetic disk.

The head slider 153 has an air introducing side 153A and an air discharging side 153B, and the magnetic recording head 5 is placed on the side face of the air discharging side 153B or the like. As shown in FIG. 3, the head slider 153 is incorporated into the head stack assembly 160. The head stack assembly 160 includes a bearing unit 157, and a head gimbal assembly (hereinafter also referred to as the HGA) 158 that extends from the bearing unit 157. The HGA is also called a magnetic head assembly. The HGA 158 includes an actuator arm 155 extending from the bearing unit 157, and a suspension 154 extending from the actuator arm 155. The head slider 153 having the magnetic recording head 5 mounted thereon is attached to the top end of the suspension 154. Accordingly, the head stack assembly 160 includes the magnetic recording head 5, the suspension 154 having the magnetic recording head 5 attached to its one end, and the actuator arm 155 connected to the other end of the suspension 154. The suspension 154 has lead wires (not shown) for writing and reading signals, and the lead wires are electrically connected to the electrodes of the magnetic recording head 5 incorporated into the head slider 153.

The magnetic recording medium 80 includes a medium substrate 81 and a magnetic recording layer 82 provided on the medium substrate 81. The magnetization of the magnetic recording layer 82 is controlled in a predetermined direction by a magnetic field generated from the writing head unit 60 and is written therein. The reproducing head unit 70 then reads the magnetization direction of the magnetic recording layer 82.

As shown in FIG. 4, the spin torque oscillator 10 includes a spin injection layer 10a having a fixed magnetization direction, an intermediate layer 10b having a high spin transmission rate, and an oscillation layer 10c. A nonmagnetic layer 10d is provided between the spin injection layer 10a and the magnetic shield 64, and a nonmagnetic layer 10e is provided between the oscillation layer 10c and the main magnetic pole 62. Accordingly, the spin torque oscillator 10 has a stacked structure formed with the nonmagnetic layer 10e, the oscillation layer 10c, the intermediate layer 10b, the spin injection layer 10a, and the nonmagnetic layer 10d. The film plane of the stacked structure is substantially perpendicular to the medium-facing surface 100 that faces the magnetic recording medium 80, and is also substantially perpendicular to the movement direction 85 of the magnetic recording medium 80. In the spin torque oscillator 10, a predetermined direct current can flow from the oscillation layer 10c toward the spin injection layer 10a via the main magnetic pole 62 and the magnetic shield 64. In this specification, direct currents also include pulse currents. When the direct current does not flow in the spin torque oscillator 10, the magnetization of the spin injection layer 10a is orientated in a direction substantially perpendicular to the film plane, and the magnetization of the oscillation layer 10c is orientated in a direction substantially parallel to the film plane. If a direct current flows into the spin torque oscillator 10 in this situation, a spin torque is applied to the magnetization of the oscillation layer 10c, and the magnetization of the oscillation layer 10c ferromagnetically resonates (the precessional movement of the magnetization). As a result, a high-frequency magnetic field is generated.

It is preferable that the nonmagnetic layers 10d and 10e are made of Ti, Cu, Ru, Ta, Zr, Nb, Hf, Pt, Pd, or the like. The nonmagnetic layers 10d and 10e function as a base layer and a cap layer. In a case where the formation of the layers starts from the side of the main magnetic pole 62 when the spin torque oscillator 10 is formed, the nonmagnetic layer 10e serves as the base layer, and the nonmagnetic layer 10d serves as the cap layer. In a case where the formation of the layers starts from the side of the magnetic shield 64, the nonmagnetic layer 10d serves as the base layer, and the nonmagnetic layer 10e serves as the cap layer. The nonmagnetic layers 10e and 10d have the function to adjust the magnetic coupling between the main magnetic pole 62 and the spin torque oscillator 10, and the magnetic coupling between the magnetic shield 64 and the spin torque oscillator 10. The nonmagnetic layers 10e and 10d may also be used as electrodes of the spin torque oscillator 10.

It is preferable that the intermediate layer 10b is made of a nonmagnetic material having a high spin transmission rate, such as Cu, Au, or Ag. The thickness of the intermediate layer 10b should preferably be in the range of 0.2 nm to 10 nm. The thickness of the intermediate layer 10b should preferably have the smallest possible value that can restrict the magnetic coupling between the oscillation layer 10c and the spin injection layer 10a to an appropriate value. In view of this, it is preferable that the intermediate layer 10b is 1 nm to 3 nm in thickness.

It is preferable that the oscillation layer 10c is made of a material that has a magnetization direction substantially parallel to the film plane when a current is not flowing. More specifically, it is preferable that the oscillation layer 10c is made of an alloy having a relatively small magnetic anisotropic energy $K_u$, such as CoFe, CoNiFe, NiFe, CoZrNb, FeN, FeSi, FeAlSi, FeCoAl, or FeCoSi. The thickness of the oscillation layer 10c should preferably be 5 nm to 30 nm, and the saturation flux density Bs should preferably be 0.5 T to 2 T.

It is preferable that the spin injection layer 10a is made of a magnetic material that has a magnetization easy axis perpendicular to the film plane and has a large magnetic anisotropic energy $K_u$. More specifically, it is preferable that the spin injection layer 10a is made of one of the following materials:

(1) a CoCr-based alloy such as CoCrPt, CoCrTa, CoCrTaPt, or CoCrTaNb;

(2) an RE-TM-based amorphous alloy such as TbFeCo;

(3) a Co artificial lattice such as Co/Pd, Co/Pt, or CoCrTa/Pd;

(4) a CoPt-based alloy or an FePt-based alloy;

(5) an SmCo-based alloy; and (6) a stacked structure formed with one of the above materials (1) through (5) and an alloy such as a CoFe-alloy to be used as an oscillation layer. The magnetic anisotropic energy $K_u$ of the spin injection layer 10a should preferably be in the range of 1 Merg/cm$^3$ to 10 Merg/cm$^3$. The film thickness of the spin injection layer 10a should preferably be in the range of 10 nm to 30 nm.

To achieve stable oscillations through the processional movement around the magnetization direction axis in the spin torque oscillator 10, it is preferable that the size of the oscillation layer 10c in the track width direction is equal to the size of the oscillation layer 10c in the direction perpendicular to the medium-facing surface 100. In this embodiment, the oscillation layer 10c is placed in the vicinity of the main magnetic pole 62, with the nonmagnetic layer 10e being interposed in between, as shown in FIG. 4. Alternatively, to effectively induce the magnetic field from the main magnetic pole 62 into the spin injection layer 10a, the spin injection layer 10a may be placed in the vicinity of the main magnetic pole 62.

Figure 6:
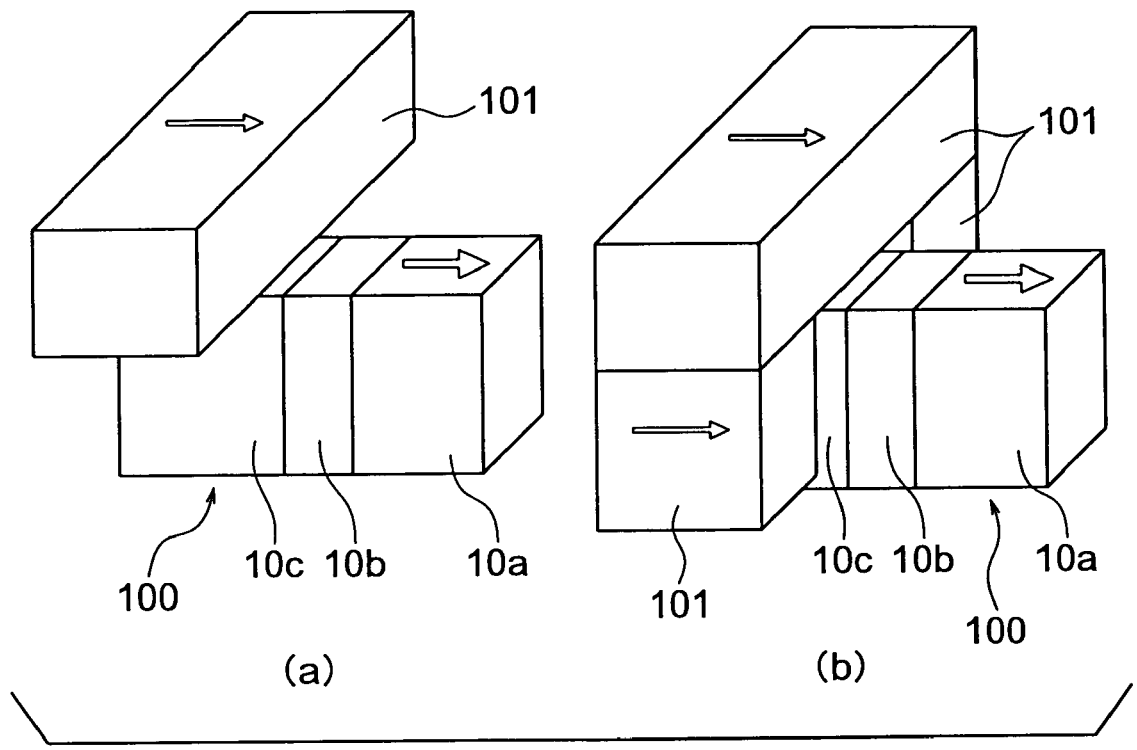
FIGS. 6(a) and 6(b) are perspective views showing other examples of arrangement of the sidewall magnetic layers.

The sidewall magnetic layers 101 are placed in the vicinities of at least part of the side face of the oscillation layer 10c, or the surface not in contact with the nonmagnetic layer 10e and the intermediate layer 10b. Although an example case where the sidewall magnetic layers 101 are placed in the vicinities of the two side faces existing in the track width direction is shown in FIG. 4, a sidewall magnetic layer 101 may be placed in the vicinity of only one side face. As shown in FIG. 6(a), the sidewall magnetic layer 101 may also be placed in the vicinity of the face (side face) of the oscillation layer 10c on the opposite side from the medium-facing surface 100. As shown in FIG. 6(b), the sidewall magnetic layers 101 may also be placed in contact with one another, so as to cover all the faces of the oscillation layer 10c except for the medium-facing surface 100. The sidewall magnetic layers 101 may also be placed to cover not only the side faces of the oscillation layer 10c but also to extend to the nonmagnetic layer 10e and the spin injection layer 10a.

The sidewall magnetic layers 101 may be formed with a hard film made of a CoPt-based alloy or the like having a magnetization easy axis in a direction perpendicular to the film plane. A recording magnetic field is to be induced in the direction perpendicular to the film plane. By virtue of the sidewall magnetic layers 101 magnetized in this direction, the effect to reduce the recording magnetic field applied to the oscillation layer 10c can be made greater. In this case, the magnetization easy axis of the sidewall magnetic layers 101 is substantially parallel to the magnetization direction (the magnetization easy axis) of the spin injection layer 10a. Accordingly, the sidewall magnetic layers 101 and the spin injection layer 10a have magnetic anisotropy in substantially in the same directions.

Alternatively, the sidewall magnetic layers 101 may be made of a FeCo-based alloy that has higher saturation flux density Bs than the oscillation layer 10c. Accordingly, the recording magnetic field can be more easily applied to the sidewall magnetic layers 101 than to the oscillation layer 10c, and the effect to reduce the recording magnetic field applied to the oscillation layer 10c can be made even greater.

To prevent the current in the oscillation layer 10c from flowing into the sidewall magnetic layers 101, it is preferable to provide insulating layers 102 (see FIG. 5) between the oscillation layer 10c and the sidewall magnetic layers 101. The sidewall magnetic layers 101 can be formed by the same method as the method for manufacturing a CoPt-based hard bias film on each sidewall of a TMR device or a GMR device of a vertical energization type, with an insulating layer being interposed in between. However, a base layer made of Ru or the like is used to turn the magnetic anisotropy of a CoPt-based alloy into a direction perpendicular to the film plane. Normally, a base layer made of Cr is used in TMR devices and GMR devices.

In the spin torque oscillator 10 having the above structure, when the polarity of the write magnetic field generated from the main magnetic pole 62 is reversed, and the magnetic field in the opposite direction is applied to the spin torque oscillator 10, the oscillation frequency greatly varies, and the oscillation stops in some cases. To avoid such a problem, it is preferable that the magnetization of the spin injection layer 10a is reversed in synchronization with reversals of the polarity of the magnetic field generated from the main magnetic pole 62. In this case, the magnetization of the oscillation layer 10c is reversed in the same manner as above. The spin torque oscillator 10 involving such an operation is called a pin-flip spin torque oscillator. The coercive force of the spin injection layer 10a is set smaller than the recording magnetic field to be applied to the spin injection layer 10a (the coercive force of the oscillation layer 10c is also set smaller, of course), so as to realize the pin-flip spin torque oscillator 10. By setting not only the coercive force of the spin injection layer 10a smaller but also the coercive force of the sidewall magnetic layers 101 smaller than the recording magnetic field, the magnetization of the sidewall magnetic layers 101 is also reversed. Accordingly, a reliable effect to reduce the recording magnetic field to be applied to the oscillation layer 10c can be achieved, regardless of the polarity of the recording magnetic field.

In this embodiment, the magnetic shield 64 is provided not only in the track movement direction but also in the track width direction, so as to prevent writing on adjacent tracks, as shown in FIG. 5. In other words, the magnetic shield 64 is provided to face not only the surface of the spin torque oscillator 10 extending in the track movement direction, but also the surfaces of the main magnetic pole 62 and the spin torque oscillator 10 extending in the track width direction. The sidewall magnetic layers 101 are provided between the spin torque oscillator 10 and the magnetic shield 64 in the track width direction. It is preferable that the distance between the magnetic shield 64 and the main magnetic pole 62 in the track width direction, and the distance between the magnetic shield 64 and the spin torque oscillator 10 in the track width direction are in the range of 10 nm to 60 nm. The optimum distances are determined by the various conditions such as the track width. As the track width becomes smaller, the distances need to be shortened. The magnetic shield 64 is made of an alloy such as FeCo, NiFe, or FeCoNi. Although an example case where the main magnetic pole 62 and the magnetic shield 64 are used as the electrodes of the spin torque oscillator 10 is shown in FIG. 5, the base layer and the capping portion of the nonmagnetic layer 10d or the spin injection layer 10a may be made thicker and used as the electrodes. In a case where the main magnetic pole 62 is used as one of the electrodes for supplying current to the spin torque oscillator 10 is used to shorten the distance between the main magnetic pole 62 and the oscillation layer 10c that is the source of high-frequency magnetic fields, as in this embodiment, the magnetic field generated from the main magnetic pole 62 is overlapped with a high-frequency magnetic field, but the recording efficiency becomes higher.

As described above, in accordance with this embodiment, the variation in the oscillation characteristics of the spin torque oscillator due to the write magnetic field generated from the main magnetic pole can be reduced, and the write magnetic field generated from the main magnetic pole toward the spin torque oscillator can also be reduced.

(Modification)

Figure 7:
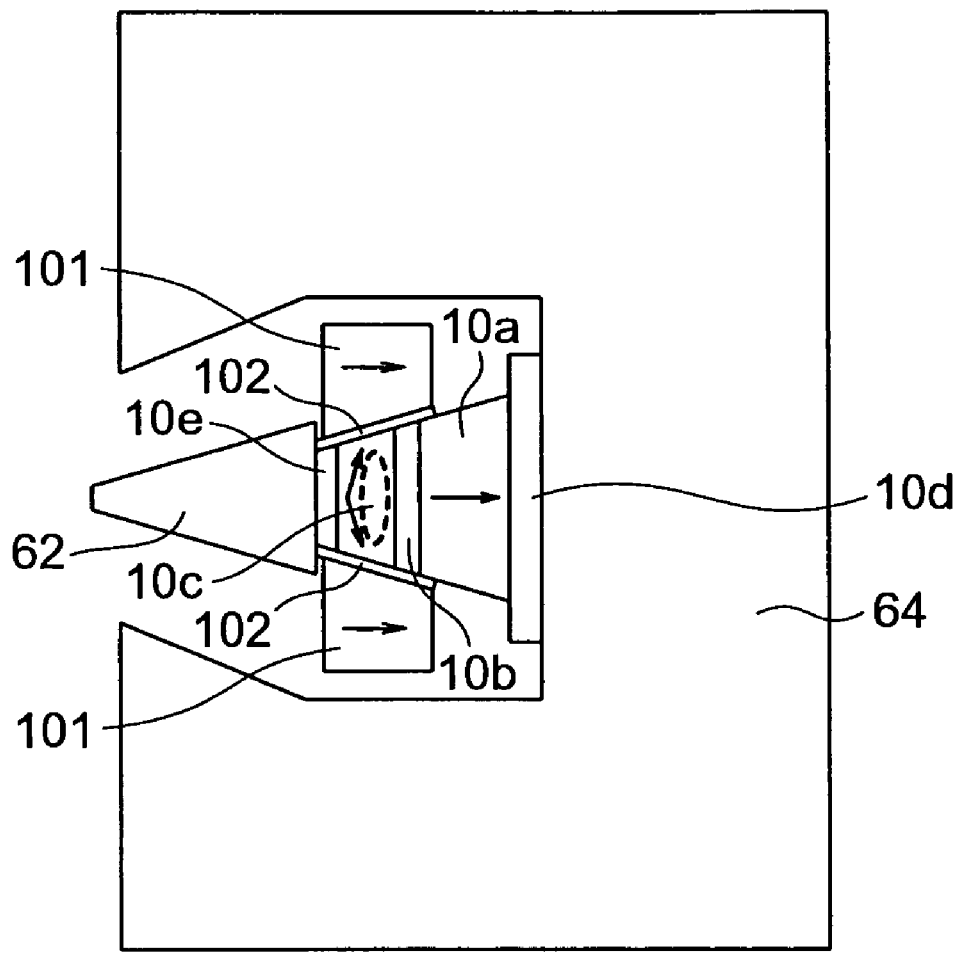
FIG. 7 is a plan view of a magnetic recording head according to a modification of the first embodiment.
Figure 7:
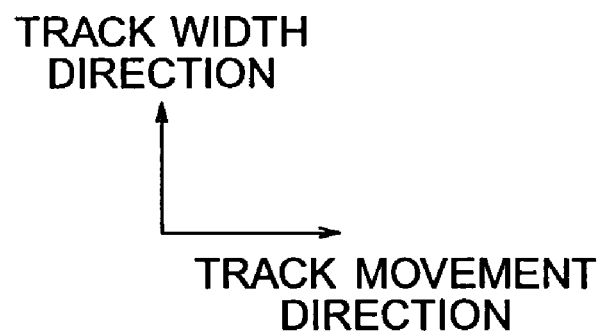

FIG. 7 shows a magnetic recording head in accordance with a modification of the first embodiment. FIG. 7 is a plan view of the magnetic recording head of this modification, seen from the medium-facing surface (ABS). In this modification, the length of the oscillation layer 10c in the track width direction is made smaller than the length of the spin injection layer 10a, so that the cross-sectional area of the oscillation layer 10c in the current flowing direction becomes smaller than the cross-sectional area of the spin injection layer 10a. As a result, the current density in the spin injection layer 10a is maintained at a low level, and only the current density in the oscillation layer 10c can be efficiently made higher. Accordingly, heat generation can be restrained, and the oscillation layer 10c can have high current density. Thus, the spin torque oscillator of this modification can have higher reliability than the spin torque oscillator of the first embodiment.

Although the cross-sectional areas are adjusted by changing the lengths in the track width direction, the cross-sectional areas of the spin injection layer 10a and the oscillation layer 10c may be adjusted by changing the lengths in a direction perpendicular to the medium-facing surface 100 (or a direction perpendicular to the track width direction and the track movement direction).

As in the first embodiment, the variation in the oscillation characteristics of the spin torque oscillator due to the write magnetic field generated from the main magnetic pole can be reduced, and the write magnetic field generated from the main magnetic pole toward the spin torque oscillator can also be reduced in this modification.

(Second Embodiment)

Figure 8:
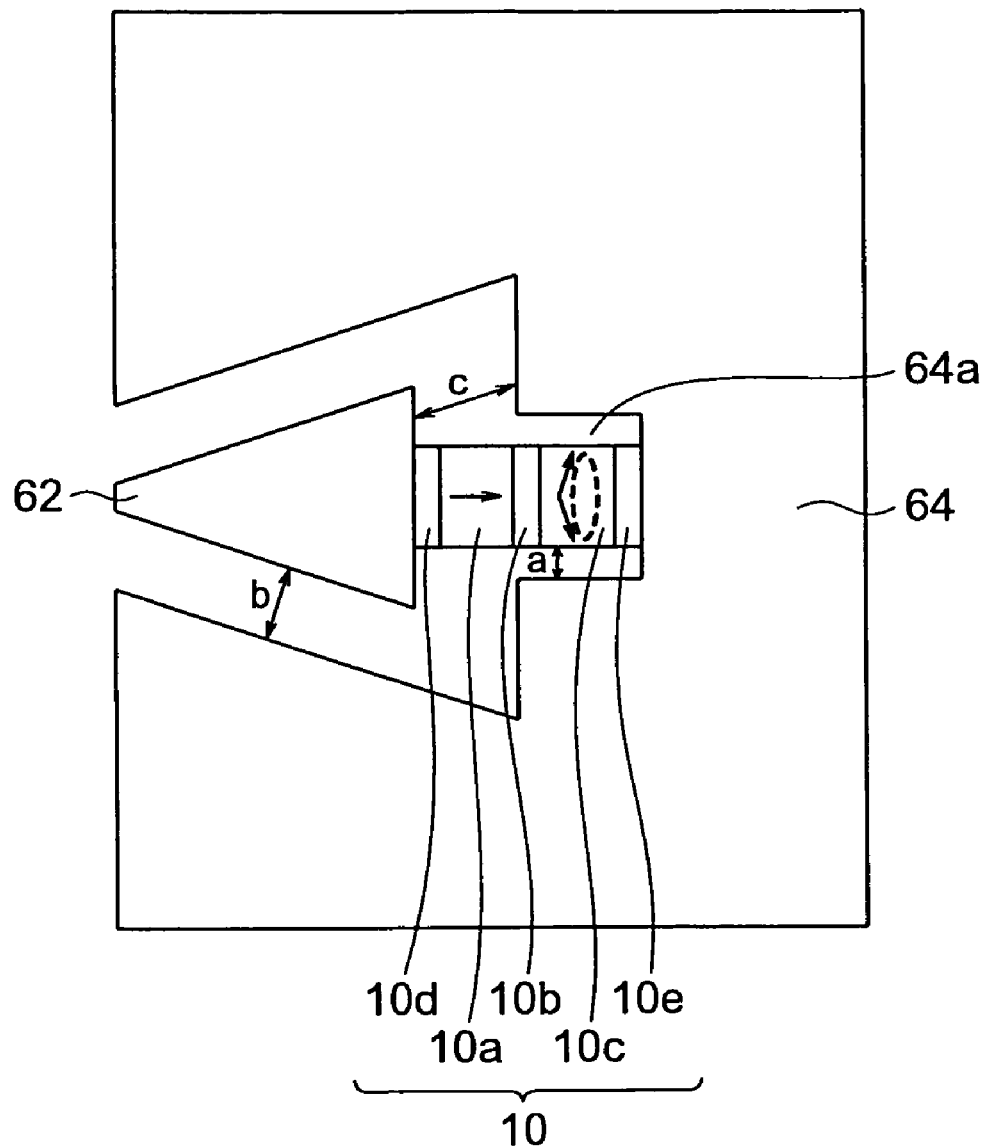
FIG. 8 is a plan view of a magnetic recording head according to a second embodiment.
Figure 8:
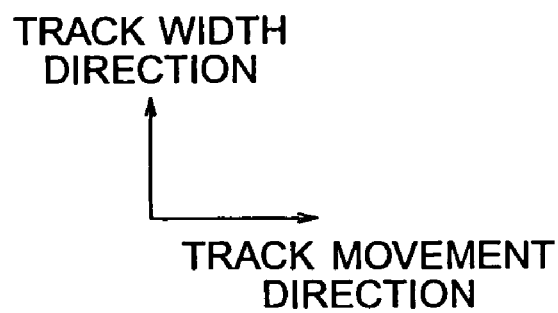

Referring now to FIG. 8, a magnetic recording head in accordance with a second embodiment of the present invention is described. FIG. 8 is a plan view of the magnetic recording head of this embodiment, seen from the medium-facing surface.

This embodiment differs from the first embodiment in that the sidewall magnetic layers 101 are replaced with the magnetic shield 64. More specifically, the magnetic shield 64 is placed in the vicinities of the track width direction sides of the main magnetic pole 62 and the spin torque oscillator 10. In this embodiment, at least the oscillation layer 10c and the nonmagnetic layer 10e among the layers of the spin torque oscillator 10 are located within a concave portion 64a formed in the magnetic shield 64, as shown in FIG. 8. In this case, the nonmagnetic layer 10e is in contact with the bottom face of the concave portion 64a. Although an example case where the magnetic shield 64 is placed in the vicinities of and faces both track-width direction side faces of each of the main magnetic pole 62 and the spin torque oscillator 10 is shown in FIG. 8, the magnetic shield 64 may be provided to face only one of the two side faces of each of the main magnetic pole 62 and the spin torque oscillator 10.

In the magnetic recording head of this embodiment, the distance a (preferably 5 nm to 20 nm) between the spin torque oscillator 10 and the magnetic shield 64 in the track width direction is shorter than the distance b (preferably 10 nm to 60 nm) between the main magnetic pole 62 and the magnetic shield 64 in the track width direction. With this arrangement, the recording magnetic field to be applied to the oscillation layer 10c is guided toward the magnetic shield 64 neighboring the oscillation layer 10, and an excess flow of the recording magnetic field to the oscillation layer 10c can be prevented. Furthermore, the space c formed between the main magnetic pole 62 and the magnetic shield 64 neighboring the oscillation layer 10c functions as a recording space. Accordingly, in this embodiment, it is possible to form a narrower recording space than in a conventional case where the magnetic shield is placed on the trailing side (the rear side when seen from the movement direction). As a result, linear recording density can be made higher. More specifically, a strong recording magnetic field induced in a direction tilted from the direction perpendicular to the film plane is generated in the magnetic space. Meanwhile, the high-frequency magnetic field effective for writing is generated inside the medium surface. The in-plane component becomes the largest in the vicinity of the oscillation layer 10c, not immediately below the oscillation layer 10c generating the high-frequency magnetic field. Accordingly, a diagonal recording magnetic field and an in-plane high-frequency magnetic field can be overlapped with each other in a small region on a magnetic recording medium.

In this embodiment, the spin injection layer 10a is placed between the main magnetic pole 62 and the oscillation layer 10c, as shown in FIG. 8. In this case, a large recording magnetic field is induced into the spin injection layer 10a, and accordingly, this embodiment is suitable to cases involving the pin-flip spin torque oscillator 10.

Figure 9:
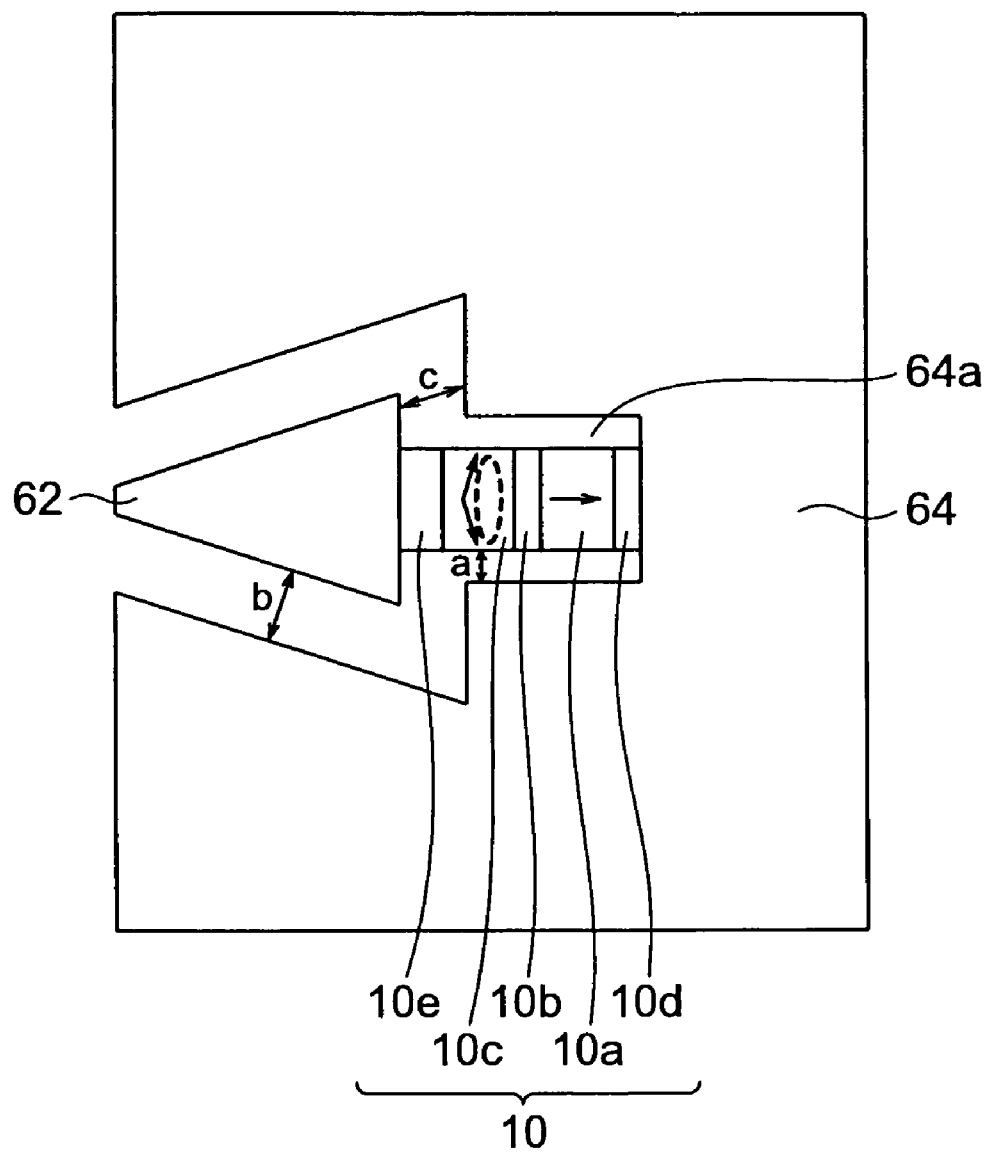
FIG. 9 is a plan view of a magnetic recording head according to a first modification of the second embodiment.

FIG. 9 shows a magnetic recording head that has the oscillation layer 10c placed between the main magnetic pole 62 and the spin injection layer 10a in accordance with a first modification of this embodiment. This magnetic recording head has the advantages that it is easy to place the oscillation layer 10c closer to the magnetic space c, and the intensity of the high-frequency magnetic field in the magnetic space c can be increased. In this modification, not only the oscillation layer 10c of the spin torque oscillator 10 but also the intermediate layer 10b, the spin injection layer 10a, and the nonmagnetic layer 10d are located within the concave portion 64a of the magnetic shield 64. In this case, the nonmagnetic layer 10d is in contact with the bottom face of the concave portion 64a.

Figure 10:
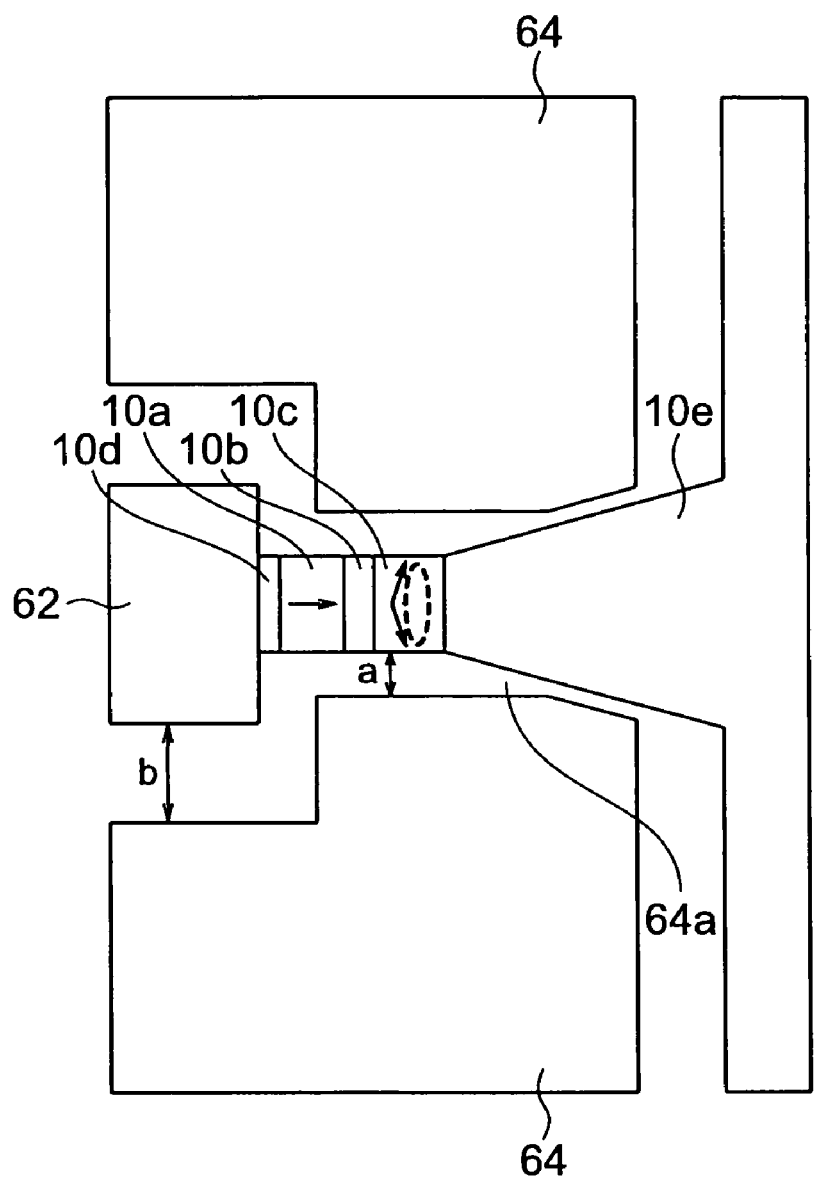
FIG. 10 is a plan view of a magnetic recording head according to a second modification of the second embodiment.

FIG. 10 shows a magnetic recording head in accordance with a second modification of the second embodiment. To make the magnetic space c narrower than in the magnetic recording head of the second embodiment shown in FIG. 8, the magnetic shield 64 may also exist on the sides of the spin injection layer 10a. In this case, the concave portion 64a of the magnetic shield 64 penetrates the magnetic shield 64 in the track movement direction. The nonmagnetic layer 10e is designed to extend from the oscillation layer 10c to the outside of the magnetic shield 64 through the concave portion 64a and the surface of the magnetic shield 64 on the opposite side from the main magnetic pole 62. In this embodiment, current flows between the main magnetic pole 62 also serving as an electrode and the nonmagnetic layer 10e also serving as an electrode in the spin torque oscillator 10. Since the concave portion 64a of the magnetic shield 64 penetrates in the track movement direction, a sufficient space can be secured to accommodate the nonmagnetic layer 10e also serving as an electrode. Instead of the nonmagnetic layer 10e, the magnetic shield 64 is used as an electrode. With this arrangement, it is necessary to provide an insulating portion between the main magnetic pole 62 and the magnetic shield 64, as well as at the connecting portion with the spin torque oscillator 10, which is a different aspect from this modification. As a result, another magnetic space is formed, and the recording efficiency might become lower. In this modification, on the other hand, it is not necessary to insulate the magnetic shield 64 and the main magnetic pole 62 from each other, and such a problem can be avoided.

Figure 11:
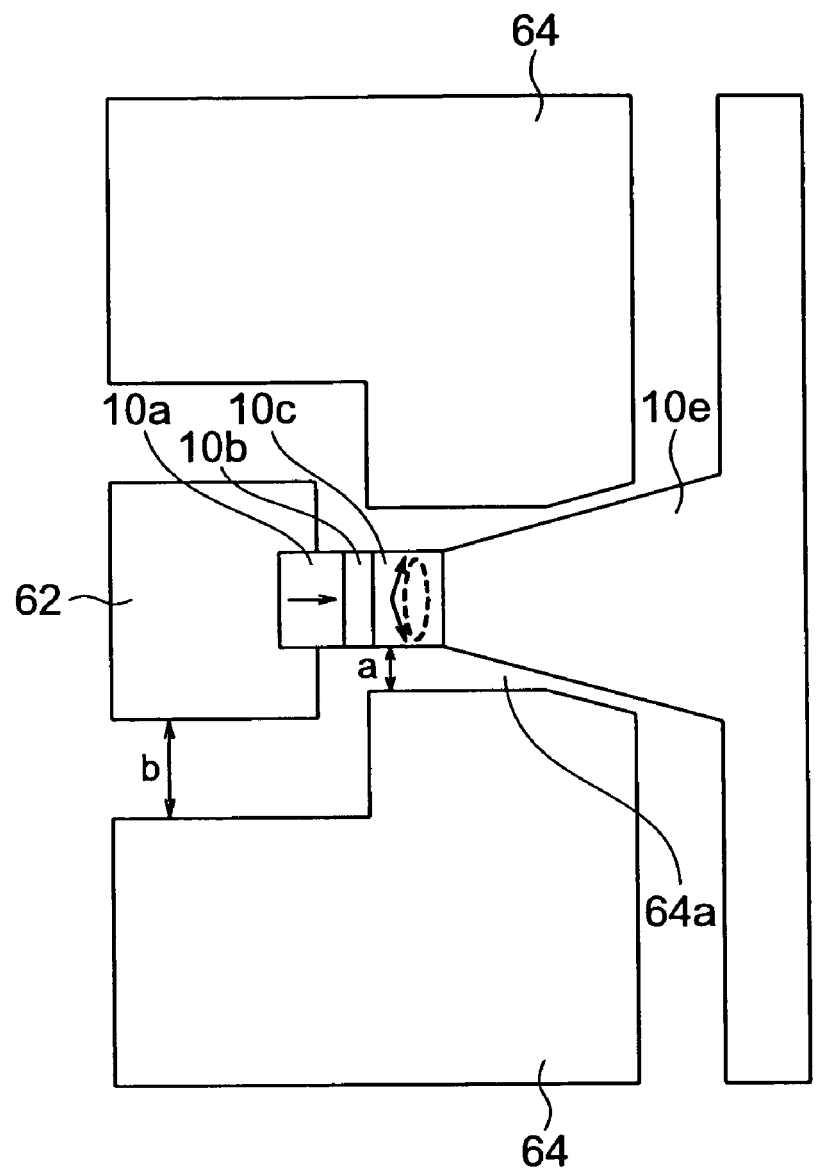
FIG. 11 is a plan view of a magnetic recording head according to a third modification of the second embodiment.
Figure 11:
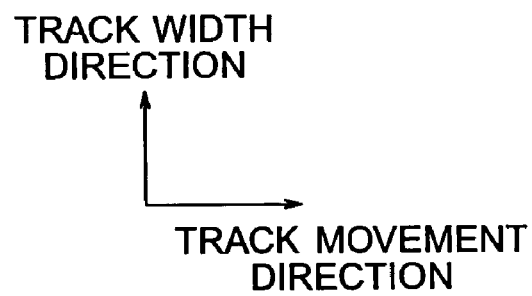

FIG. 11 shows a magnetic recording head in accordance with a third modification of the second embodiment. This magnetic recording head differs from the magnetic recording head of the second modification, in that the spin injection layer 10a is partially buried in the main magnetic pole 62, as shown in FIG. 11. In this case, the same effects as those of the second modification can be achieved. In the second embodiment and the first modification of the second embodiment, the planar shape of the main magnetic pole 62 on the medium-facing surface is a trapezoid that has a width becoming smaller on the trailing side. In the second and third modifications of the second embodiment, the planar shape of the main magnetic pole 62 on the medium-facing surface is a rectangle. However, the planar shape of the main magnetic pole 62 of the second and third modifications may have a trapezoidal structure as in the first embodiment.

As described above, in the second embodiment and its modifications, sidewall nonmagnetic layers are not provided, but the magnetic shield 64 is placed in the vicinities of the side faces of the oscillation layer 10c of the spin torque oscillator 10. Accordingly, the variation in the oscillation characteristics of the spin torque oscillator due to the write magnetic field generated from the main magnetic pole can be reduced, and the write magnetic field generated from the main magnetic pole toward the spin torque oscillator can also be reduced, as in the first embodiment and its modification.

(Third Embodiment)

Next, a magnetic recording/reproducing apparatus in accordance with a third embodiment of the present invention is described. The magnetic recording head of any of the embodiments and modifications illustrated in FIGS. 1 through 11 can be incorporated into a head stack assembly of a recording/reproducing type, and can be mounted on a magnetic recording/reproducing apparatus. The magnetic recording/reproducing apparatus of this embodiment includes: a magnetic recording medium; the magnetic recording head of one of the above embodiments; a movement control unit that controls the magnetic recording medium and the magnetic recording head to have relative movements in a floating or contact state, the magnetic recording medium and the magnetic head assembly facing each other; a position control unit that controls the magnetic recording head to be located in a predetermined recording position on the magnetic recording medium; and a signal processing unit that performs processing on a signal for writing on the magnetic recording medium and a signal for reading from the magnetic recording medium, with the use of the magnetic recording head.

Figure 12:
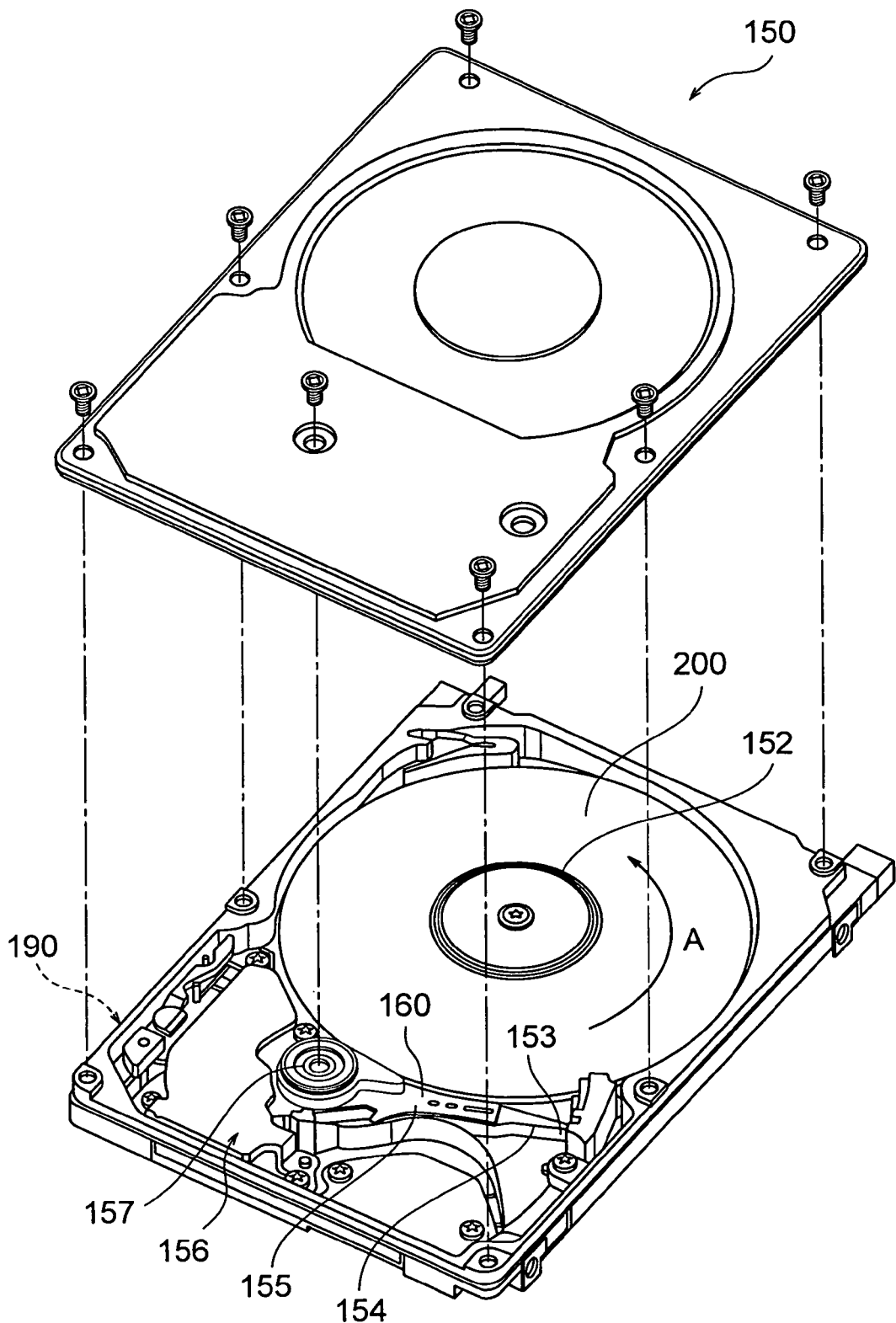
FIG. 12 is a schematic perspective view showing the structure of a magnetic recording/reproducing apparatus according to a third embodiment.

FIG. 12 is a substantial perspective view showing an example of schematic structure of the magnetic recording/reproducing apparatus. The magnetic recording/reproducing apparatus 150 of this embodiment is an apparatus that includes a rotary actuator. In FIG. 12, a magnetic disk 200 for longitudinal recording and vertical recording is mounted on a spindle 152, and is rotated in the direction of the arrow A by a motor (not shown) that responses to a control signal supplied from a drive control unit (not shown). The magnetic disk 200 is a two-layer magnetic recording medium that has a recording layer for vertical recording and soft-magnetic backing layer. A head slider 153 that records and reproduces information stored in the magnetic disk 200 is attached to the top end of a thin-film suspension 154. The head slider 153 has the magnetic recording head of one of the above embodiments mounted on its top end portion, for example. The suspension 154 is connected to one end of an actuator arm 155. A voice coil motor 156 that is a kind of a linear motor is provided at the other end of the actuator arm 155. The voice coil motor 156 may include a drive coil (not shown) wound around a bobbin portion of the actuator arm 155, and a magnetic circuit formed with a permanent magnet and an opposed yoke, with the drive coil being interposed between the permanent magnet and the opposed yoke. The permanent magnet and the opposed yoke face are arranged to face each other.

The actuator arm 155 is held by ball bearings (not shown) provided at the upper portion and the lower portion of a bearing unit 157, and can rotatively slide with the assistance of the voice coil motor 156.

When the magnetic disk 200 revolves, the medium-facing surface (ABS) of the head slider 153 is held at a predetermined floating distance from the surface of the magnetic disk 200.

The magnetic recording/reproducing apparatus of this embodiment further includes a signal processing unit 190 (not shown) that performs signal writing and reading on the magnetic recording medium 200 with the use of the magnetic recording head. For example, the signal processing unit 190 is provided on the back side of the magnetic recording/reproducing apparatus shown in FIG. 12. The input and output lines of the signal processing unit 190 are connected to the electrodes pads of the head stack assembly 160, and are electrically coupled to the magnetic recording head.

In a case where a magnetic recording head having a lower ratio than 1 between a high-frequency magnetic field Hac and a recording magnetic field Hr (=Hac/Hr) to be applied to the magnetic recording medium is used in the magnetic recording/reproducing apparatus of this embodiment having the above structure, the revolving direction of the disk as the magnetic recording medium, or the movement direction of the magnetic recording medium, should preferably be a trailing recording direction, with the disk first passing through the main magnetic pole and then passing through the spin torque oscillator. According to the trailing recording technique, the spin torque oscillator is placed on the trailing side of the movement direction of the magnetic recording medium (at the rear side when seen from the movement direction). In this case, recording is not performed in the region (with a strong high-frequency magnetic field) in the vicinity of the spin torque oscillator at which the recording magnetic field becomes weaker. Rather, recording is determined in the region (with a strong recording magnetic field) on the magnetic recording medium located close to the main magnetic pole. Accordingly, recording can be performed with high linear recording density. In a case where the high-frequency magnetic field is a main magnetic field while the recording magnetic field is a sub magnetic field, or where a magnetic recording head having a higher ratio than 1 between the high-frequency magnetic field Hac and the recording magnetic field Hr (=Hac/Hr) to be applied to the magnetic recording medium is used, the revolving direction of the disk as the magnetic recording medium, or the movement direction of the magnetic recording medium, should preferably be a leading recording direction, with the disk first passing through the spin torque oscillator and then passing through the main magnetic pole. According to the leading recording technique, the spin torque oscillator is placed on the leading side of the movement direction of the magnetic recording medium (at the top side when seen from the movement direction). In this case, recording is not performed in the region in the vicinity of the main magnetic pole at which the high-frequency magnetic field becomes weaker. Rather, recording is determined in the region on the magnetic recording medium located close to the spin torque oscillator. Accordingly, recording can be performed with high linear recording density.

In the magnetic recording/reproducing apparatus in accordance with the third embodiment of the present invention, it is preferable that the oscillation frequency of the spin torque oscillator is substantially equal to the later described ferromagnetic resonance frequency of the recording magnetic particles or the recording magnetic dots that form the recording magnetic layer of the magnetic recording medium.

The embodiments of the present invention have been described so far, with reference to specific examples. However, the present invention is not limited to those specific examples. For example, the magnetic recording media that can be used in the present invention are not limited to the magnetic recording medium 80 illustrated in FIG. 1.

Figure 13:
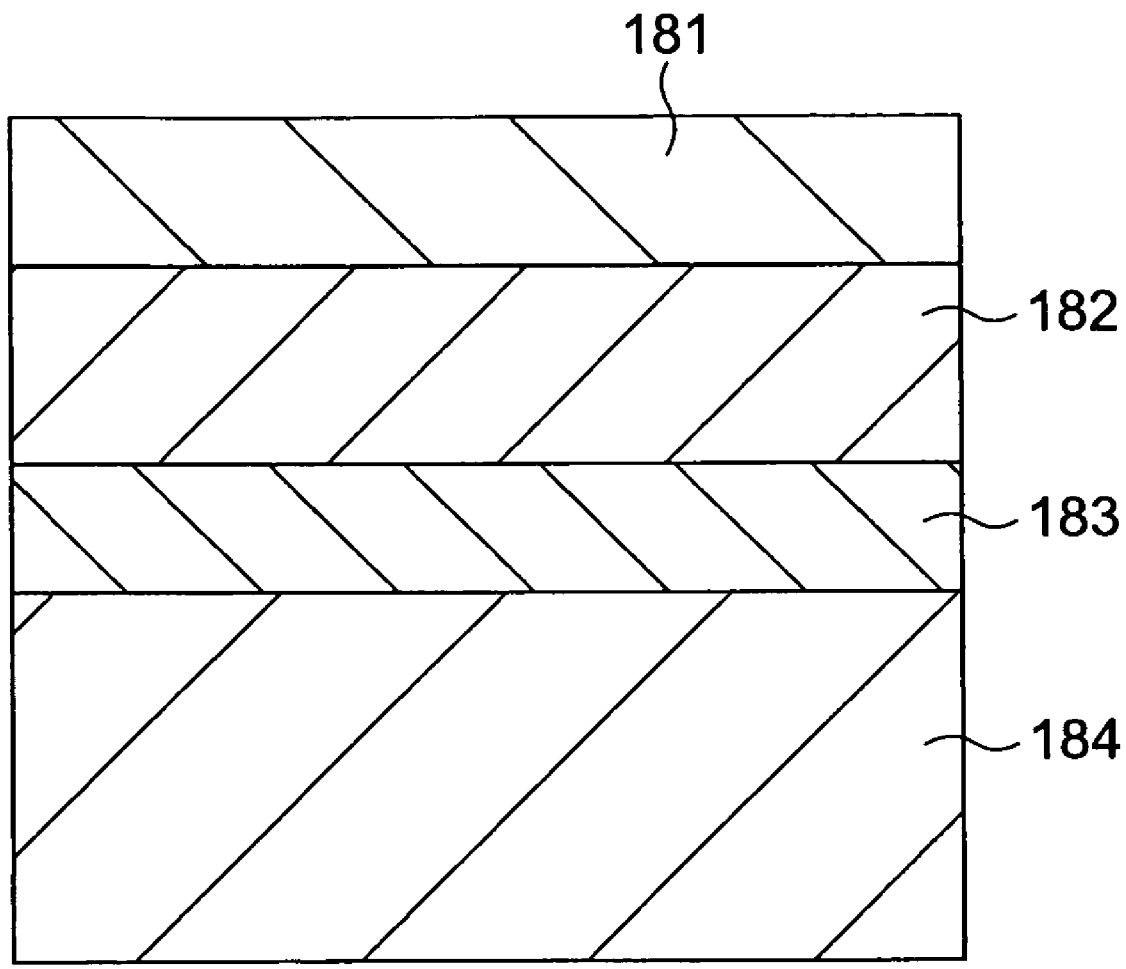
FIG. 13 is a cross-sectional view showing a first specific example of a magnetic recording medium.

FIG. 13 shows a first specific example of a magnetic recording medium 180 that can be used in the magnetic recording/reproducing apparatus of each of the embodiments of the present invention. A soft underlayer 184, an intermediate layer 183, a recording magnetic layer 182, and a recording magnetic layer 181 are stacked in this order on a substrate (not shown). An overcoat such as a diamond-like carbon film (not shown) is further stacked on the surface of the stacked structure. The magnetic anisotropy of the upper recording magnetic layer 181 located closer to the magnetic recording head should preferably be smaller than the magnetic anisotropy of the lower recording magnetic layer 182 located farther away from the magnetic recording head. The lower recording magnetic layer 182 has a magnetization easy axis in a direction perpendicular to the film plane, but the upper recording magnetic layer 181 may have the magnetic anisotropy in the film plane or in a direction perpendicular to the film plane or in between. The recording magnetic layer 182 is made of a material having greater magnetic anisotropy than the recording magnetic layer 181. For example, the recording magnetic layer 182 may be formed with a vertically-orientated hard magnetic film produced by mixing approximately 10% nonmagnetic oxide ($SiO_2$ or $AlO_x$) with a CoCrPt alloy. A vertically-orientated hard magnetic film produced by mixing approximately 10% $SiO_2$ with $CO_{74}Cr_{10}Pt_{16}$ has an anisotropic magnetic field Hk of approximately 14 kOe. It is also possible to use FePt or the like having a high anisotropic magnetic field Hk. The recording magnetic layer 181 may be formed with a hard magnetic film that is hcp (hexagonal closest packing)-grown by mixing a nonmagnetic oxide such as $SiO_2$ with Co. This hard magnetic film has a magnetic anisotropic magnetic field Hk of approximately 6.8 kOe.

A Co-based alloy that does not contain $SiO_2$ may also be used. The recording magnetic layer 181 and the recording magnetic layer 182 should preferably have such thicknesses t1 and t2 that the ratio t2/t1 falls within the range of 0.5 to 4. A layer for controlling exchange coupling may be provided between the recording magnetic layer 181 and the recording magnetic layer 182.

Through intensive studies involving simulations and the likes, the inventors found that the most efficient recording with a small recording magnetic field could be performed by matching the frequency of the high-frequency magnetic field to the ferromagnetic resonance frequency of the recording magnetic layer 181 in the two-layer medium shown in FIG. 13. As the magnetic anisotropy is small, the ferromagnetic resonance frequency of the recording magnetic layer 181 is lower than the resonance frequency of a conventional single-layer magnetic recording medium. With the use of the magnetic recording head of any of the embodiments and modification of the present invention described so far, the recording magnetic field to be applied to the oscillation layer is reduced. Through intensive studies involving simulations and the likes, the inventors found that the frequency of the high-frequency magnetic field was proportional to the recording magnetic field induced in the oscillation layer. Accordingly, the matching between the resonance frequency of the magnetic recording medium and the frequency of the high-frequency magnetic field is improved by using the magnetic recording head of any of the embodiments and modifications of the present invention suitable for reducing the frequency of the high-frequency magnetic field in the magnetic recording/reproducing apparatus that uses the magnetic recording medium shown in FIG. 13. Thus, recording becomes even easier, and a magnetic recording/reproducing apparatus with high recording density can be realized. Also, by combining the two-layer magnetic recording medium shown in FIG. 13 with the magnetic recording head of one of the embodiments that reduce the recording magnetic field to be applied to the oscillation layer and reduce the frequency of the high-frequency magnetic field, it becomes possible to perform recording on a magnetic recording medium of a fine crystal size that has large magnetic anisotropy suitable for high-density recording, which has been difficult in conventional cases.

With the use of the magnetic recording head of any of the first and second embodiments and modifications, a large high-frequency magnetic field might be induced at the track width end portions. Therefore, it is preferable that such a magnetic recording head is used together with a medium having a nonmagnetic region between each two adjacent tracks. An example of such a medium is a so-called discrete track medium. A discrete track medium does not have a nonmagnetic region in its movement direction, except for the crystal grain boundaries. It is also possible to use a so-called patterned medium that clearly has nonmagnetic regions in the track movement direction. In the case of a magnetic recording head of an embodiment (such as the second embodiment) that has side magnetic shields located at short distances from the spin torque oscillator in the track width direction of the spin torque oscillator, it is preferable to use a patterned medium that easily has strong recording magnetic fields generated at both ends of the track width, and has magnetic pattern portions at the respective track width end portions. Recording is to be performed on this patterned medium, with each two adjacent magnetic pattern portions in the track width direction being one information unit. Such magnetic recording media are described as second through fourth specific examples in the following.

Figure 14:
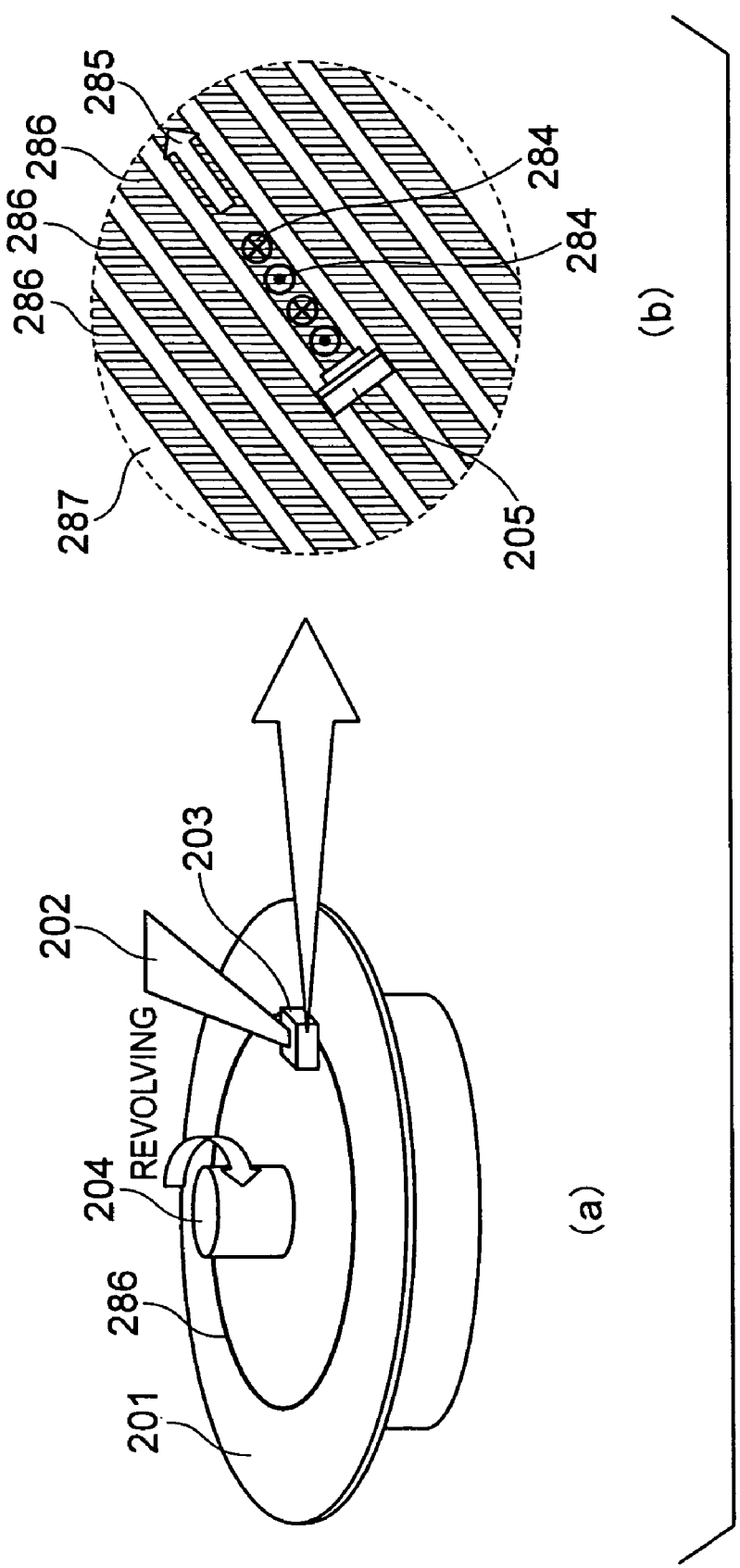
FIGS. 14(a) and 14(b) are views showing a second specific example of a magnetic recording medium.

FIG. 14 shows a second specific example of a magnetic recording medium that can be used in a magnetic recording/reproducing apparatus of the present invention.

The magnetic recording medium 201 of this specific example has multiparticle magnetic discrete tracks 286 that are vertically orientated and are isolated from one another by nonmagnetic materials (or air) 287. When the magnetic recording medium 201 is rotated by a spindle motor 204 and moves in the medium movement direction, recording magnetization 284 can be formed by a magnetic recording head 205 mounted on a head slider 203. The head slider 203 is attached to the top end of a suspension 202. The suspension 202 has lead wires for signal writing and reading, and the lead wires are electrically connected to the electrodes of the magnetic head 205 mounted on the head slider 203.

The width of the spin torque oscillator in the recording track width direction (TS) is made equal to or greater than the width of each recording track (TW), and is also made equal to or smaller than the recording track pitch (TP), so that the decrease of the coercive force of adjacent recording tracks caused by high-frequency magnetic field leakage from the spin torque oscillator can be made much smaller. Accordingly, high-frequency field assist recording can be effectively performed only on target recording tracks on the magnetic recording medium 201 of this specific example. Particularly, since a high-frequency magnetic field has high frequency and does not have a shielding effect, it is difficult to reduce excess recording on adjacent recording tracks with a shield provided in the track width direction. With the use of the magnetic head of any of the above embodiments and modifications of the present invention, the problem of adjacent recording track erasing can be solved in a magnetic recording/reproducing apparatus that uses the magnetic recording medium shown in FIG. 14. In this specific example, a magnetic medium material having a high magnetic anisotropic energy $K_u$ such as FePt or SmCo on which writing cannot be performed with a conventional magnetic recording head is used. Accordingly, the magnetic medium particles can be made even smaller (to a nanometer-order size), and a magnetic recording/reproducing apparatus having much higher linear recording density in the recording track direction (the bit direction) can be realized.

Figure 15:
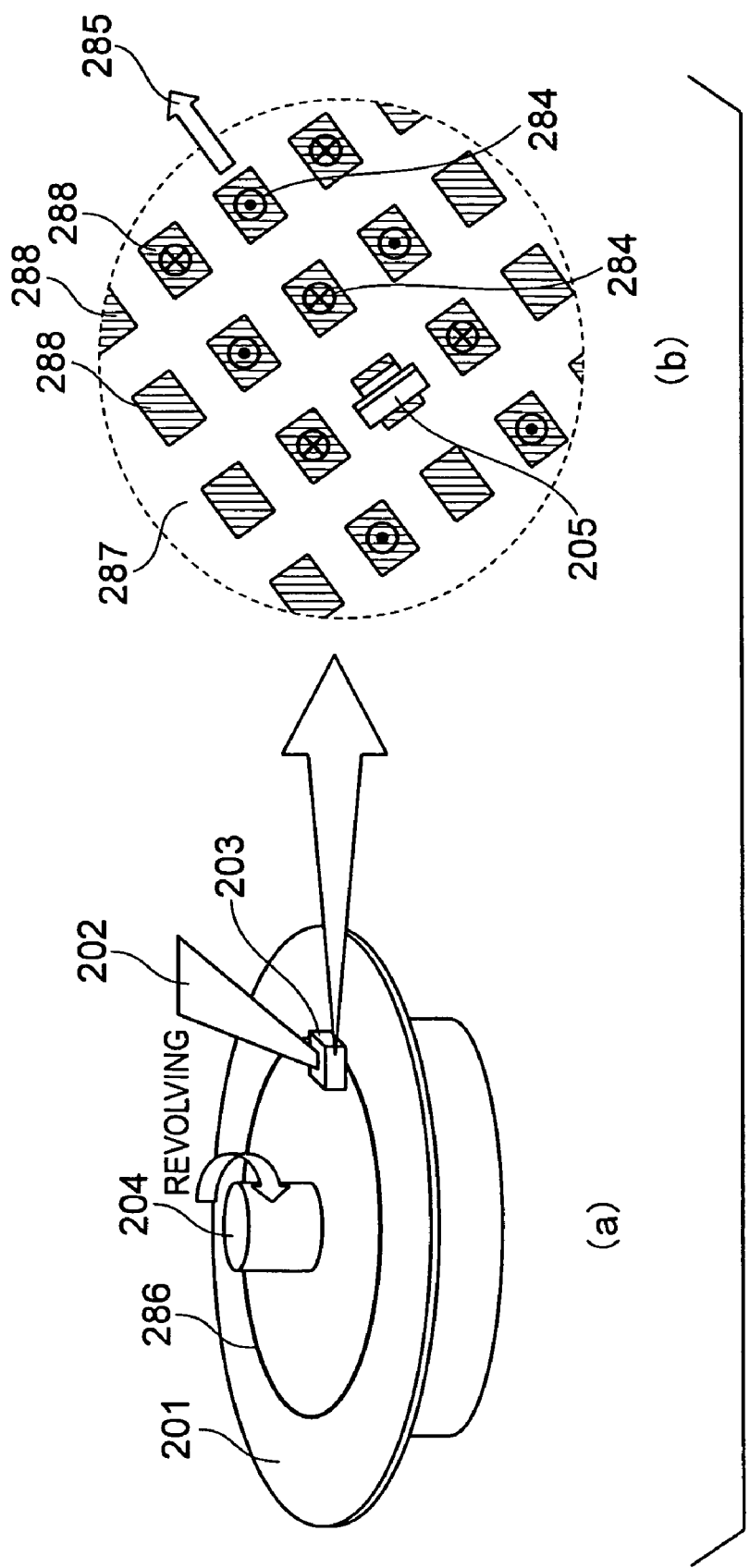
FIGS. 15(a) and 15(b) are views showing a third specific example of a magnetic recording medium.

FIG. 15 shows a third specific example of a magnetic recording medium that can be used together with the magnetic recording head of any of the embodiments of the present invention. The magnetic recording medium 201 of this specific example has magnetic discrete bits 288 that are isolated from one another by a nonmagnetic portion 287. When this magnetic recording medium 201 is rotated by a spindle motor 204 and moves in the medium movement direction, recording magnetization is formed by a magnetic recording head 205 mounted on a head slider 203.

In this specific example, the width of the spin torque oscillator in the recording track width direction (TS) is also made equal to or greater than the width of each recording track (TW), and is also made equal to or smaller than the recording track pitch (TP), so that the decrease of the coercive force between adjacent recording tracks caused by high-frequency magnetic field leakage from the spin torque oscillator can be made much smaller. Accordingly, high-frequency field assist recording can be effectively performed only on target recording tracks.

Figure 16:
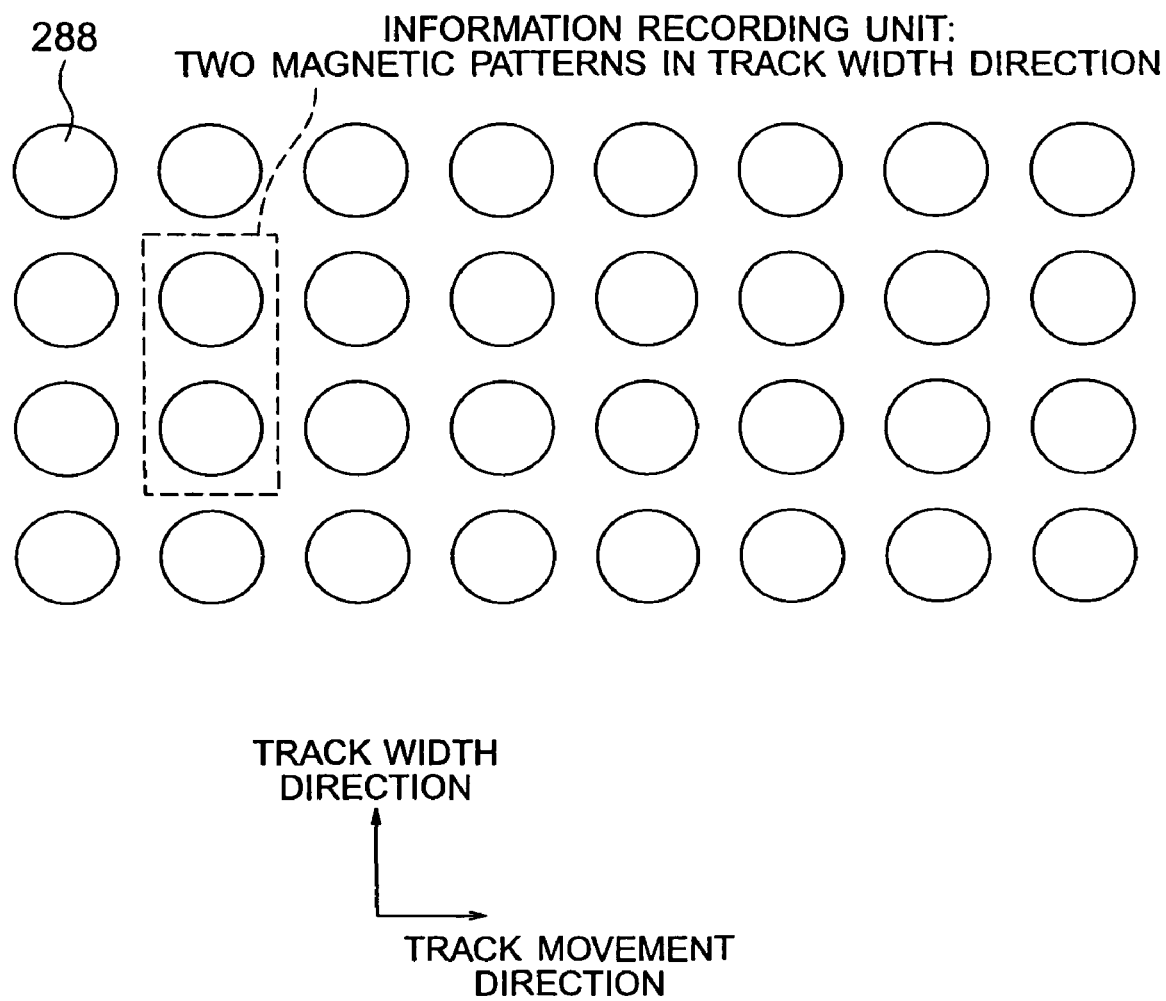
FIG. 16 is a diagram showing a fourth specific example of a magnetic recording medium.

FIG. 16 shows a fourth specific example of a magnetic recording medium that can be used together with the magnetic recording head of any of the embodiments of the present invention. The magnetic recording medium of this specific example is also formed with magnetic discrete bits 288, as in the specific example shown in FIG. 15. In the specific example shown in FIG. 16, two bits are recorded as one information unit on a track width. With the use of the magnetic head illustrated in any of FIGS. 8 through 11, two magnetic spaces are formed at both ends of the track width direction. The magnetic spaces are conformed to two adjacent bits shown in FIG. 16, so that only two bits can be recorded. Since there is a nonmagnetic region between each two adjacent bits, noise is not caused by disruption of magnetic information due to insufficient intensity of the recording magnetic field. Accordingly, a magnetic recording/reproducing apparatus with a higher S/N ratio can be realized.

As described so far, in accordance with any of the embodiments of the present invention, the magnetic field generated from the main magnetic pole toward the oscillation layer can be reduced. As a result, firstly, the current flowing in the spin torque oscillator necessary to generate a high-frequency magnetic field can be reduced. Accordingly, heat generation due to the current can be reduced. Secondly, the variation of the oscillation characteristics of the spin torque oscillator due to the write magnetic field generated from the main magnetic poles can be reduced. This effect becomes larger in a case where a pin-flip spin torque oscillator that has magnetization reversed in accordance with the positive or negative recording magnetic field is used. Thirdly, as the frequency of the high-frequency magnetic field can be reduced, the recording efficiency can be made much higher, and medium writing can be performed with a smaller magnetic field on a magnetic recording medium formed with two layers having different magnetic anisotropies from each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A magnetic head assembly comprising:
a spin torque oscillator comprising a stacked structure stacking a first magnetic layer, an intermediate layer, and a second magnetic layer, in this order, the spin torque oscillator generating a high-frequency magnetic field by applying a current between the first and second magnetic layers;
a recording magnetic pole having a first face facing to one end face of the spin torque oscillator in a stacking direction of the spin torque oscillator and a second face facing to a magnetic recording medium, the recording magnetic pole generating a write magnetic field; and
a magnetic shield comprising first and second portions, the first portion having a third face facing to the other end face of the spin torque oscillator in the stacking direction of the spin torque oscillator, a fourth face facing to the magnetic recording medium, and a fifth face different from the third and fourth faces and associated with the second portion of the magnetic shield, the second portion extending to at least the second magnetic layer along the stacking direction of the spin torque oscillator, a distance between the second portion of the magnetic shield and the second magnetic layer being shorter than a distance between the recording magnetic pole and the second portion of the magnetic shield.

2. The head assembly according to claim 1, wherein coercive force of the first magnetic layer is smaller than the write magnetic field generated from the recording magnetic pole toward the first magnetic layer.

3. The head assembly according to claim 1, wherein the second magnetic layer is located on an opposite side of the first magnetic layer from the recording magnetic pole.

4. The head assembly according to claim 1, wherein the first magnetic layer is located on an opposite side of the second magnetic layer from the recording magnetic pole.

5. The head assembly according to claim 1, further comprising two electrodes that supply the current to the spin torque oscillator, and one of the two electrodes is the recording magnetic pole.

6. The head assembly according to claim 1, wherein the first portion of the magnetic shield has a concave portion in the third face and the second magnetic layer is located within the concave portion.

7. The head assembly according to claim 1, wherein the first portion of the magnetic shield has a sixth face opposed to the fifth face, and the magnetic shield comprises a third portion connected to the sixth face and extending to at least the second magnetic layer along the stacking direction of the spin torque oscillator.

* * * * *